US012377657B2

(12) United States Patent
Yamada et al.

(10) Patent No.: US 12,377,657 B2
(45) Date of Patent: Aug. 5, 2025

(54) LIQUID CARTRIDGE AND LIQUID SUPPLY SYSTEM

(71) Applicant: BROTHER KOGYO KABUSHIKI KAISHA, Nagoya (JP)

(72) Inventors: Itta Yamada, Nagoya (JP); Hideki Hayashi, Nagoya (JP); Genki Hoshino, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 153 days.

(21) Appl. No.: 18/192,887

(22) Filed: Mar. 30, 2023

(65) Prior Publication Data

US 2023/0311531 A1 Oct. 5, 2023

(30) Foreign Application Priority Data

Mar. 31, 2022 (JP) ................................. 2022-057908

(51) Int. Cl.
*B41J 2/175* (2006.01)

(52) U.S. Cl.
CPC ......... *B41J 2/17553* (2013.01); *B41J 2/1752* (2013.01)

(58) Field of Classification Search
CPC .... B41J 2/175; B41J 2/17506; B41J 2/17509; B41J 2/1752; B41J 2/17553
See application file for complete search history.

(56) References Cited

U.S. PATENT DOCUMENTS

2013/0155156 A1* 6/2013 Harvey ................ B41J 2/17553 347/86
2013/0208061 A1* 8/2013 Harvey .................. B41J 2/1755 347/86

FOREIGN PATENT DOCUMENTS

JP 2013-540066 A 10/2013
WO 2012/054050 A1 4/2012

* cited by examiner

*Primary Examiner* — Anh T Vo
(74) *Attorney, Agent, or Firm* — KENEALY VAIDYA LLP

(57) ABSTRACT

There is provided a liquid cartridge including a casing which has front and lower surfaces, a storage chamber, and a supply port. A groove is arranged on the lower surface of the casing. The groove has left and right surfaces and an entrance port. At least one of the right and left surfaces has first and second surfaces. The first surface is directed in one orientation of the front-rear direction and in one orientation of the left-right direction. The second surface is positioned in the other orientation of the front-rear direction as compared with the first surface and is directed in the other orientation of the front-rear direction and in the one orientation of the left-right direction. The groove is configured such that a latch enters the groove.

5 Claims, 25 Drawing Sheets

LIQUID CARTRIDGE AND LIQUID SUPPLY SYSTEM

REFERENCE TO RELATED APPLICATIONS

This application claims priority from Japanese Patent Application No. 2022-057908 filed on Mar. 31, 2022. The entire content of the priority application is incorporated herein by reference.

BACKGROUND ART

For example, in an image recording apparatus based on the ink-jet system, a cartridge for accommodating an ink is exchangeable in order to supplement the ink. In the case of the known image recording apparatus, a latch abutment stopper and a latch track are provided on an outer surface of a cartridge. The latch abutment stopper is engaged with a latch, and thus the cartridge is retained in an installed state with respect to a main body.

DESCRIPTION

In the case of an image recording apparatus for the domestic use, the small-sized cartridge having a light weight, which has a small capacity, is adopted in some cases. The small-sized cartridge, which has the light weight as described above, is easily lifted up by a user by one hand to install the cartridge to the main body. On the other hand, the cartridge is easily disengaged from the main body by any urging force exerted by an elastic member or the like provided, for example, for the cartridge. Therefore, the latch and the latch abutment stopper are engaged with each other to prevent the cartridge from being disengaged from the main body in an unprepared manner.

A large-sized cartridge having a large capacity may be adopted for an image recording apparatus to be used for the industrial use. It is difficult for the user to lift up the large-sized cartridge by one hand so that the cartridge is installed to the main body. Therefore, the cartridge is installed such that the cartridge is allowed to slide while being supported by the main body. On the other hand, it is scarcely feared that the cartridge is moved in the orientation to disengage the cartridge from the main body on account of the urging force of the elastic member or the like provided, for example, for the cartridge. Therefore, it is not necessarily indispensable to adopt the configuration in which the latch is engaged with the latch abutment stopper as in the known image recording apparatus described above. However, it is desired that the user is informed of the arrival of the cartridge at the installation completion position when the cartridge is installed to the main body.

The present disclosure has been made taking the foregoing circumstances into consideration, an object of which is to provide means which sensibly informs a user of the arrival at an installation completion position of a liquid cartridge inserted into a cartridge installing unit.

The present disclosure relates to a liquid cartridge to be inserted into a cartridge installing unit in one orientation of a front-rear direction. This liquid cartridge comprises a casing which has a front surface and a lower surface, which has a storage chamber formed on an inner side, and which has a supply port arranged on the front surface and communicated with the storage chamber, and a groove which is recessed upward and which is arranged on the lower surface of the casing. The groove has an entrance port which is open on the front surface, and a right surface and a left surface which compart the groove in a left-right direction intersecting the front-rear direction. At least one of the right surface and the left surface has a first surface which is directed in the one orientation of the front-rear direction and in one orientation of the left-right direction, and a second surface which is positioned in the other orientation of the front-rear direction as compared with the first surface and which is directed in the other orientation of the front-rear direction and in the one orientation of the left-right direction. The groove is configured such that a latch, which is movable in the left-right direction in the cartridge installing unit and which is urged in the other orientation of the left-right direction, enters the groove.

When the liquid cartridge is installed to the cartridge installing unit, then the latch enters the groove, and the latch moves along the first surface and the second surface. Therefore, the user can be sensibly informed of the position at which the installation of the liquid cartridge is completed.

Figure 16:
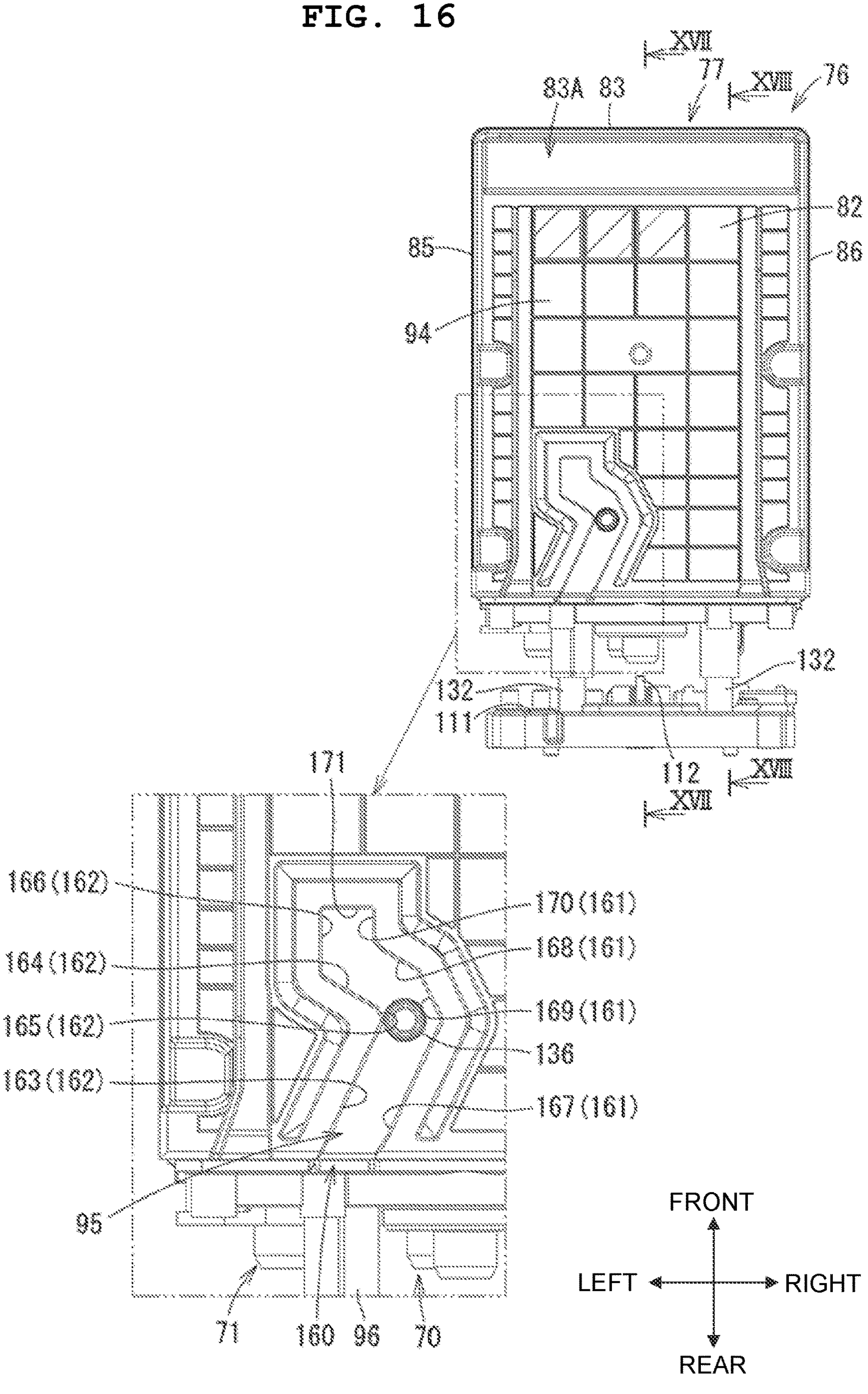

FIG. 16 is a bottom view of the cleaning liquid tank 76 and a case 130 in a state in which a latch 136 is disposed in the vicinity of a front end of a first surface 163 of a groove 95.

Figure 17:
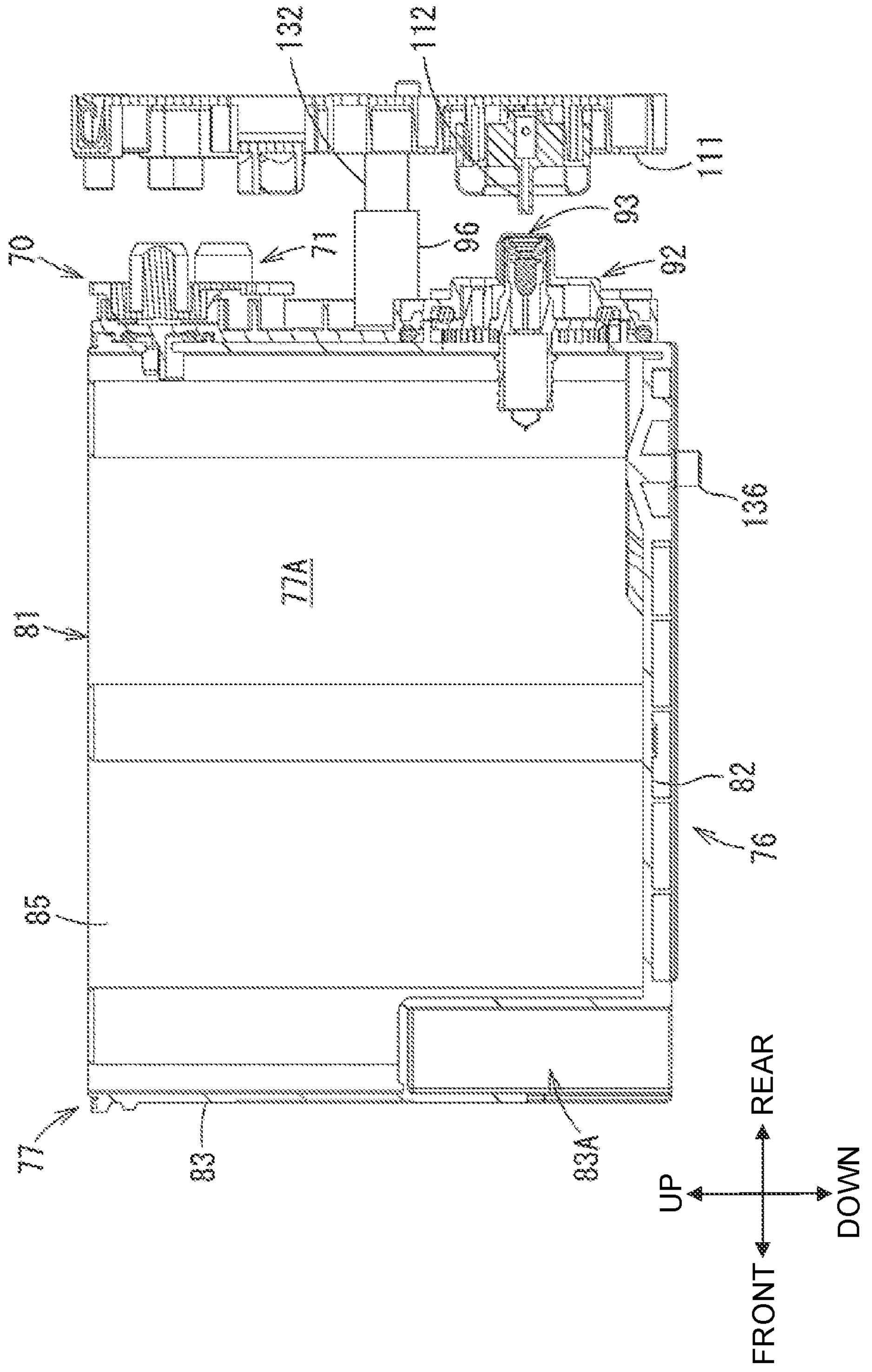

FIG. 17 is a sectional view taken along XVII-XVII depicted in FIG. 16.

Figure 18:
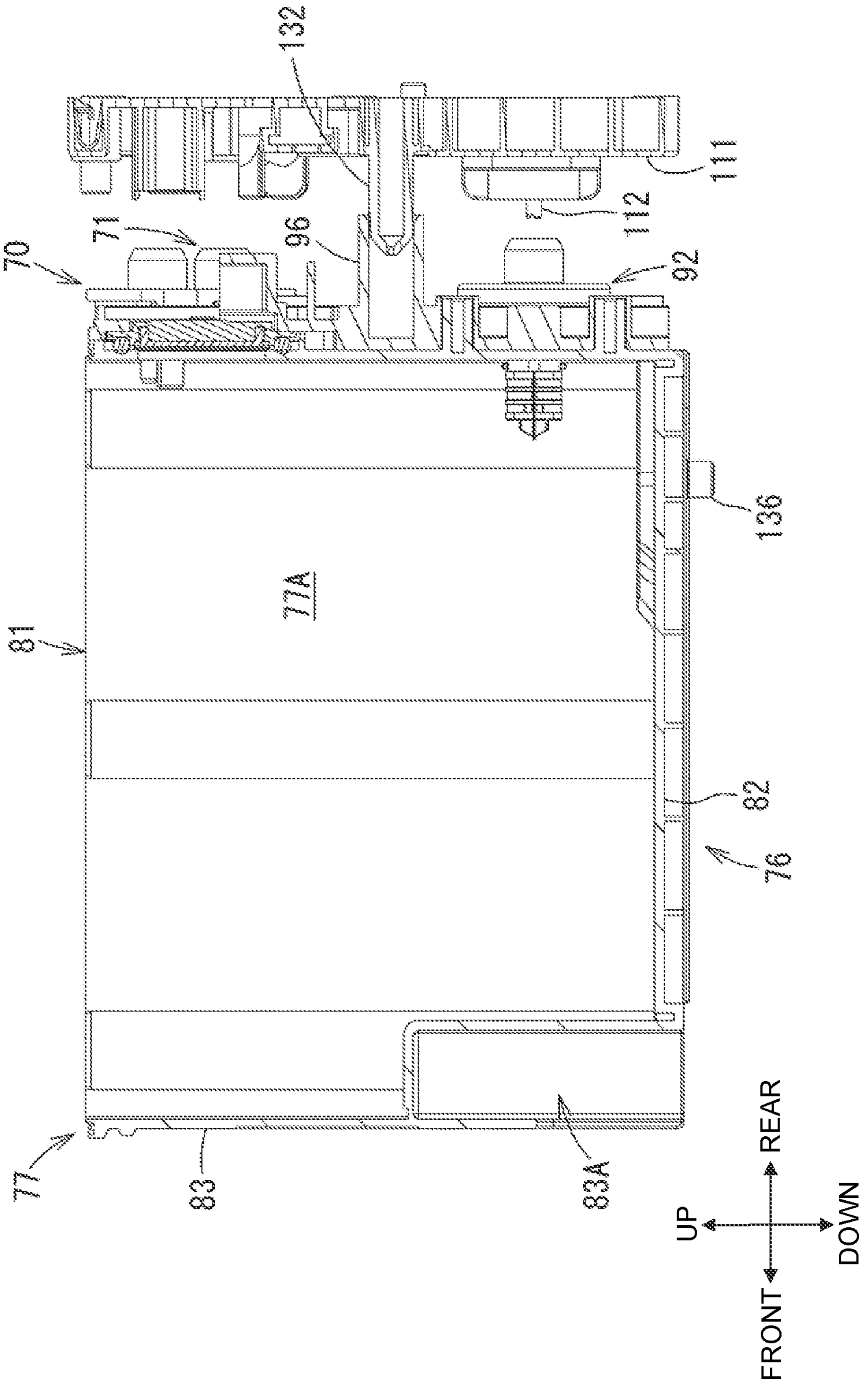

FIG. 18 is a sectional view taken along XVIII-XVIII depicted in FIG. 16.

Figure 19:
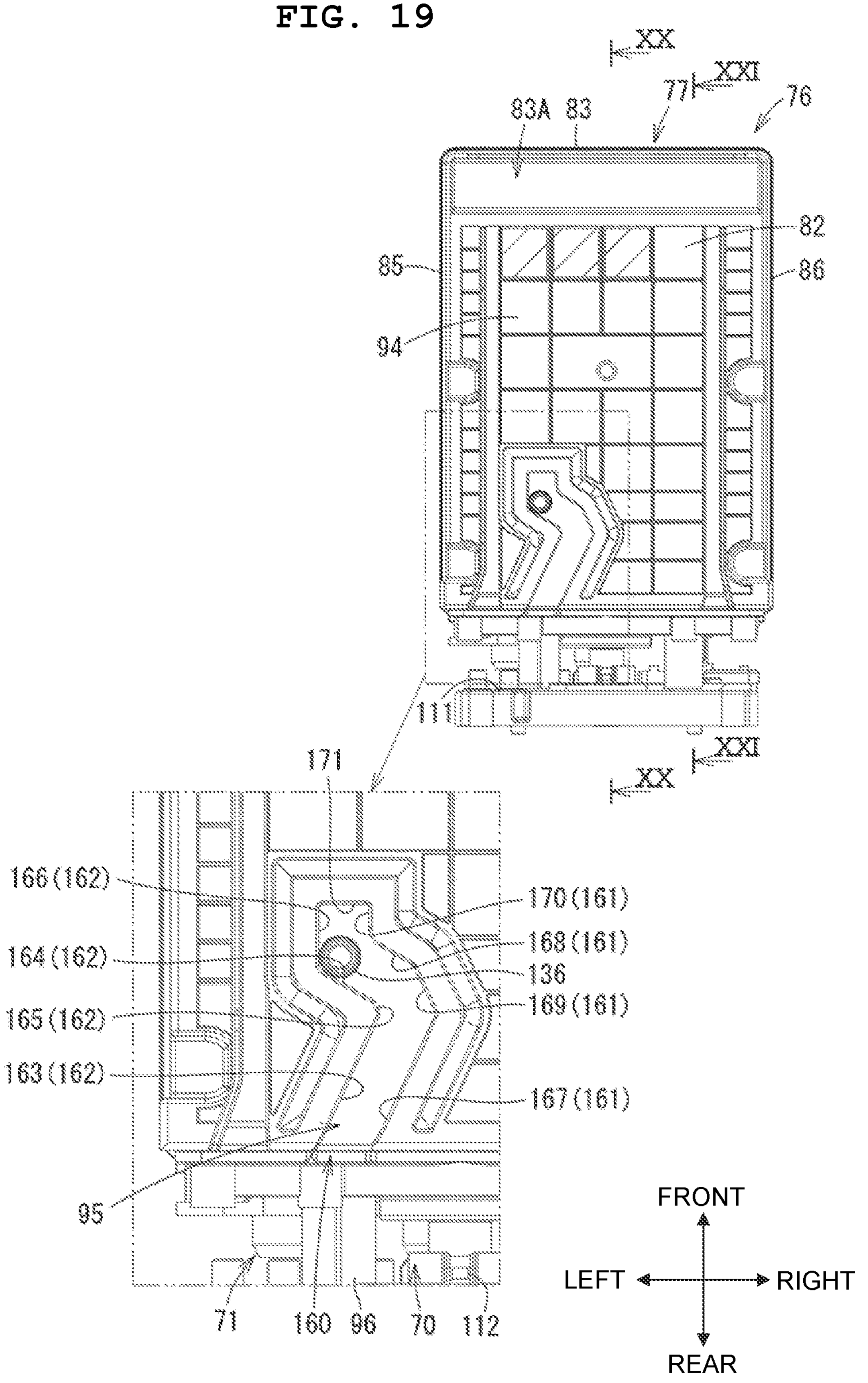

FIG. 19 is a bottom view of the cleaning liquid tank 76 and the case 130 in a state in which the latch 136 is disposed in the vicinity of a front end of a second surface 164 of the groove 95.

Figure 20:
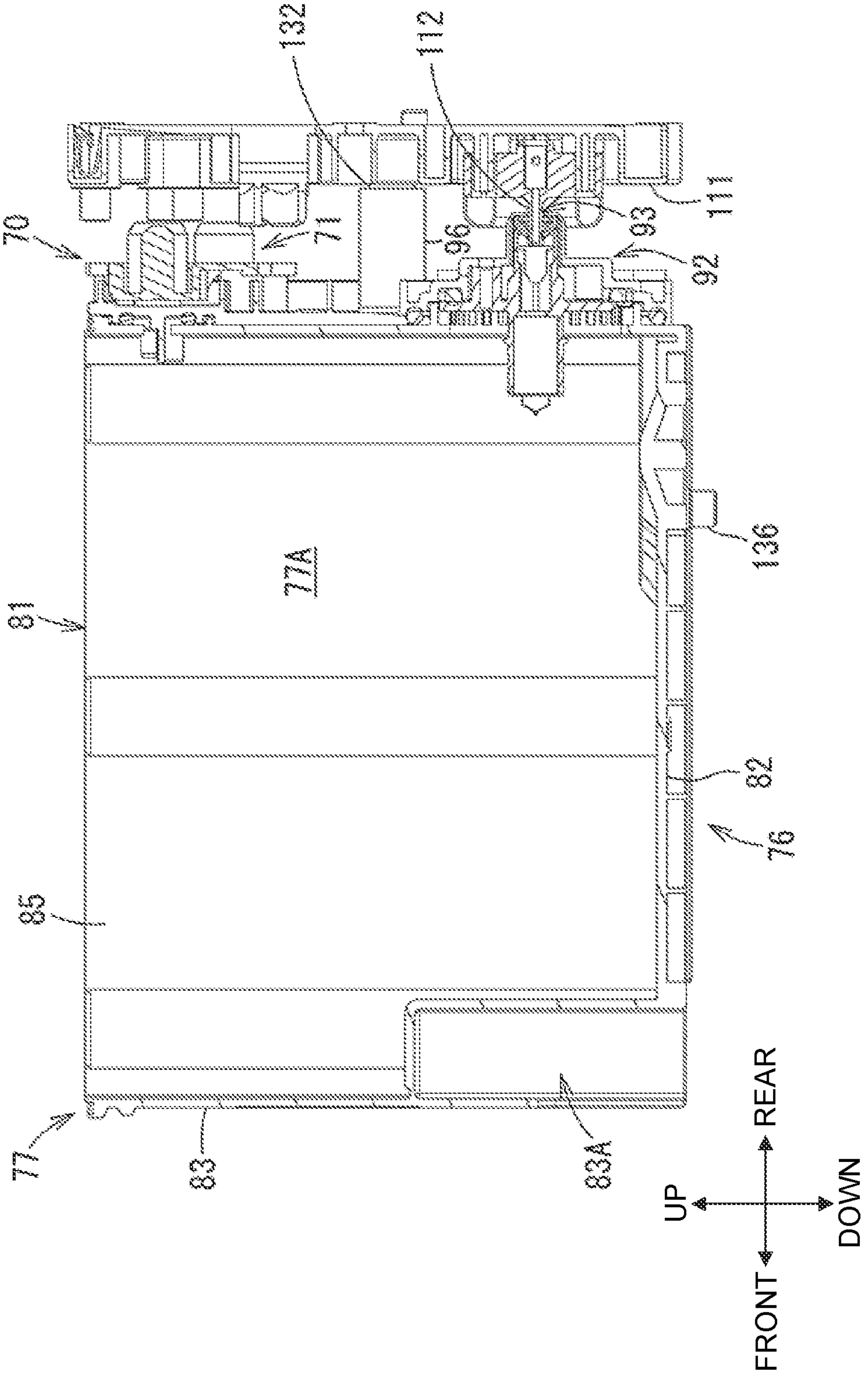

FIG. 20 is a sectional view taken along XX-XX depicted in FIG. 19.

Figure 21:
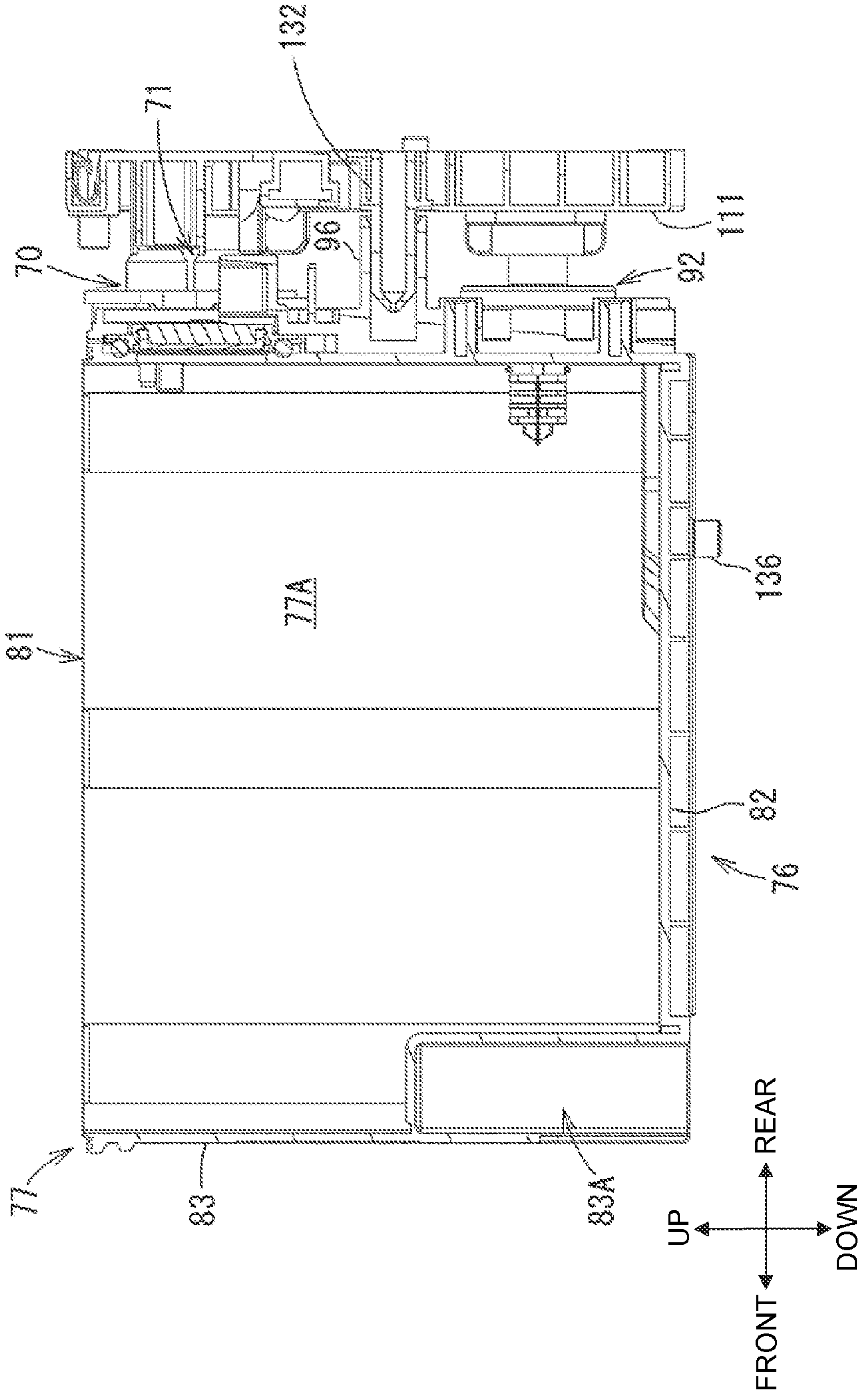

FIG. 21 is a sectional view taken along XXI-XXI depicted in FIG. 19.

Figure 22:
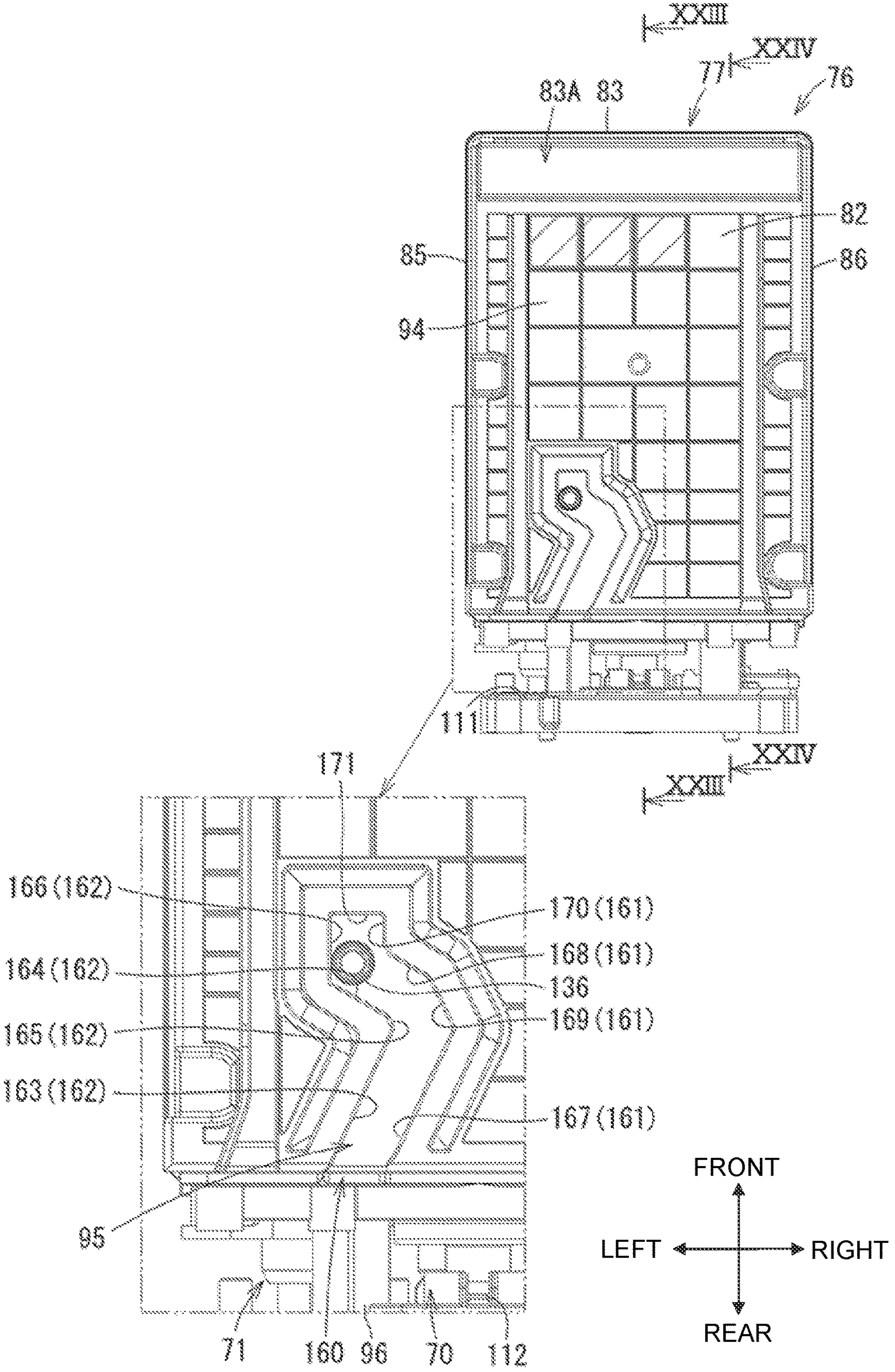

FIG. 22 is a bottom view of the cleaning liquid tank 76 and the case 130 in a state in which the latch 136 is disposed on a fourth surface 166 of the groove 95.

Figure 23:
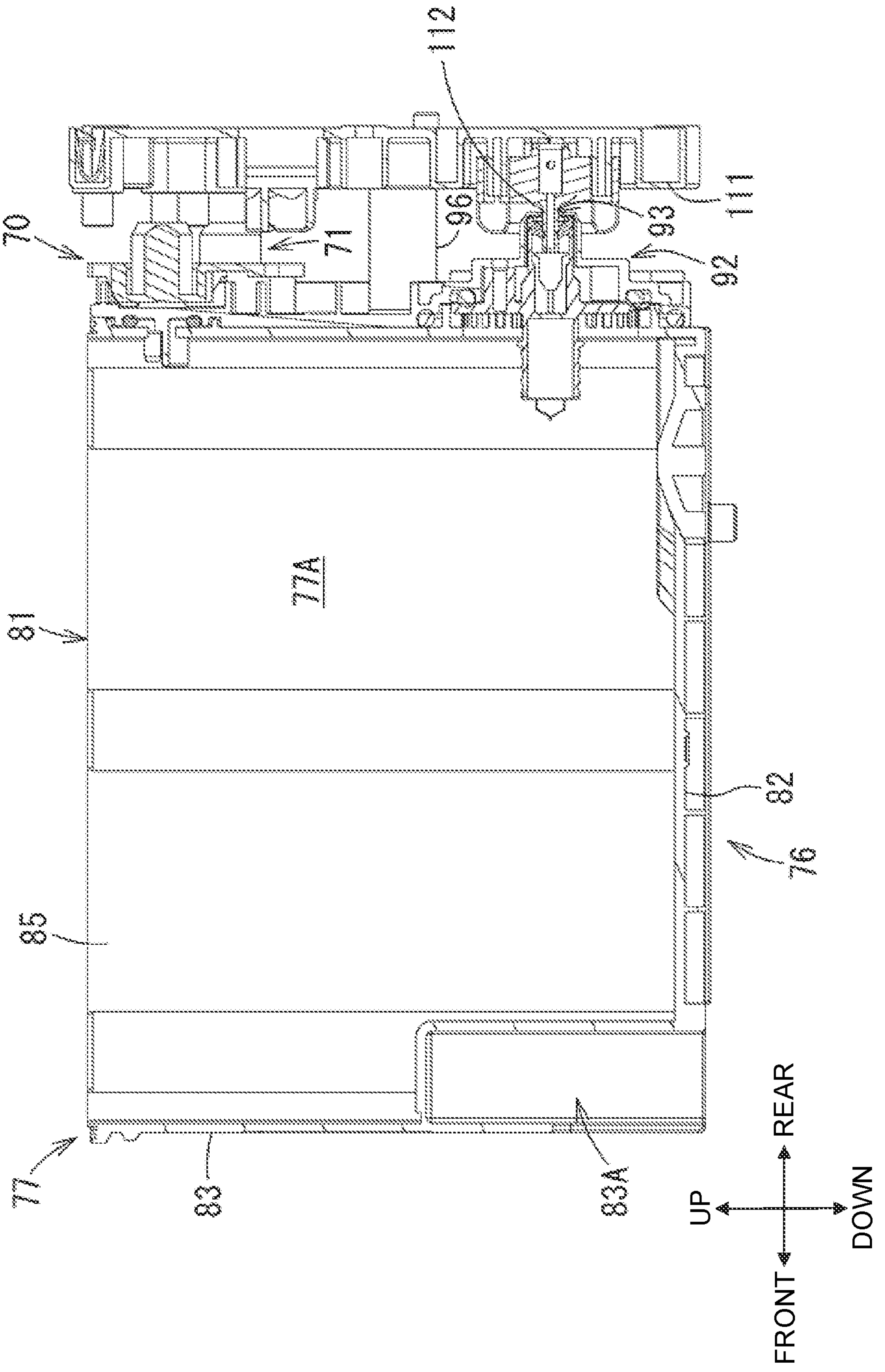

FIG. 23 is a sectional view taken along XXIII-XXIII depicted in FIG. 22.

Figure 24:
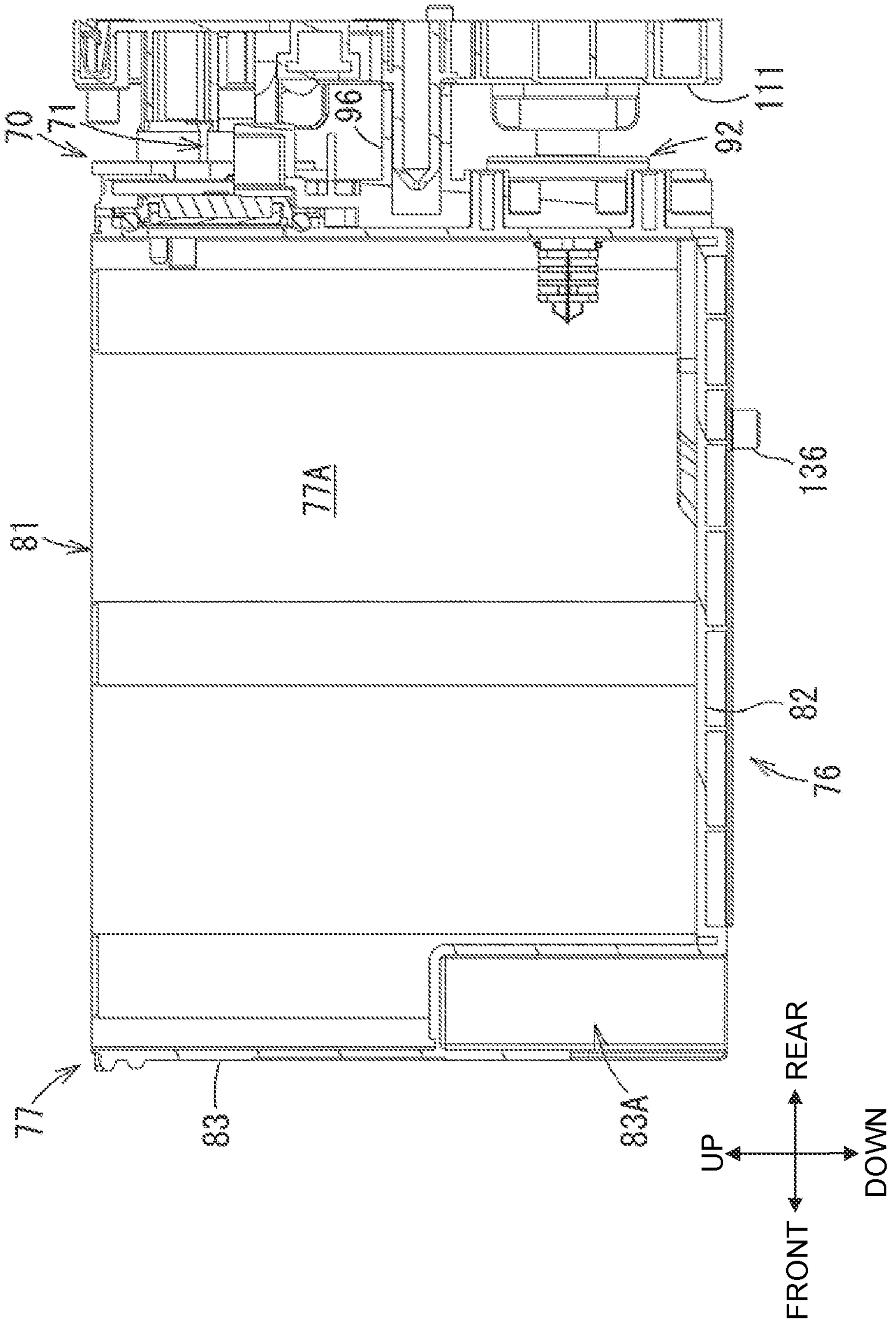

FIG. 24 is a sectional view taken along XXIV-XXIV depicted in FIG. 22.

Figure 25:
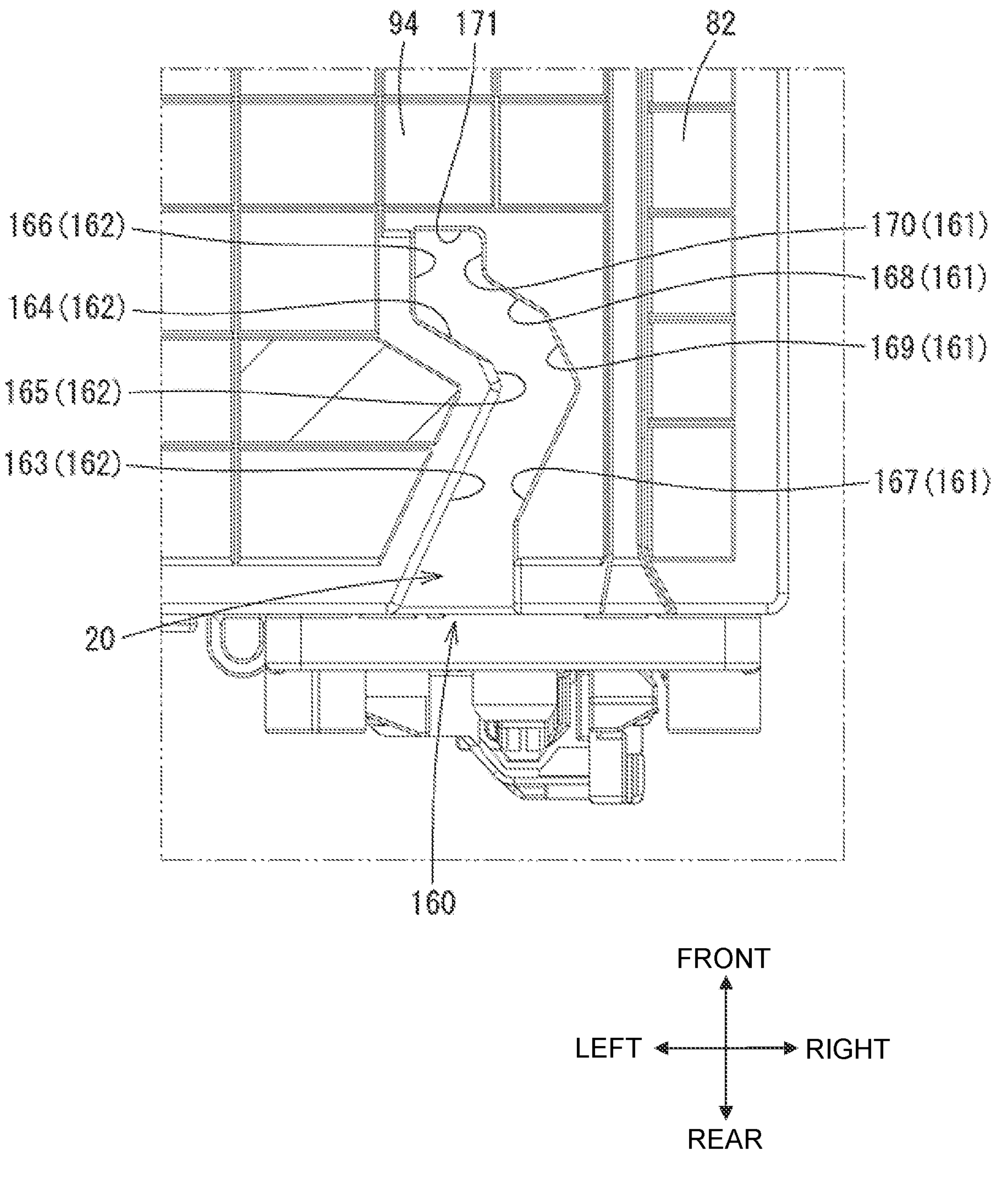

FIG. 25 is an enlarged bottom view of an ink tank 34.

An embodiment of the present disclosure will be explained below. Note that it goes without saying that the embodiment of the present disclosure is merely a mode for carrying out the present disclosure, and the mode can be changed within a range without changing the gist or essential characteristics of the present disclosure. Further, in the following explanation, the up-down direction is defined on the basis of the state (state depicted in FIG. 1) in which an image recording apparatus 100 is installed usably. The front-rear direction is defined assuming that the side, on which the discharge port 33 is provided, is the front side (front surface). The left-right direction is defined while viewing the image recording apparatus 100 from the front side (front surface).

<Exterior Configuration of Image Recording Apparatus 100>

Figure 1:
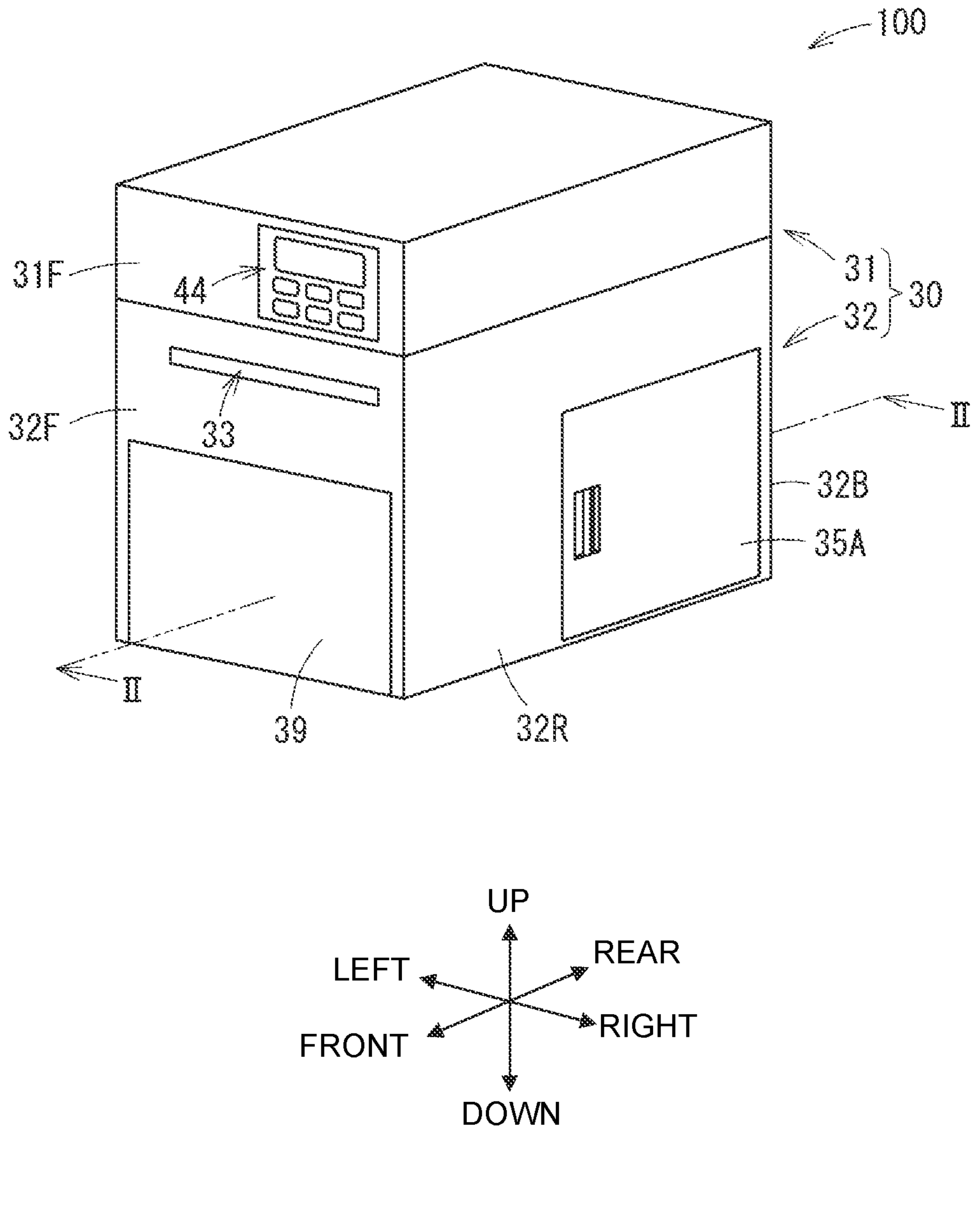
FIG. 1 is an exterior perspective view of an image recording apparatus 100.

The image recording apparatus 100 depicted in FIG. 1 (example of the liquid supply system) records an image on a sheet S which forms a roll member 37 (see FIG. 2) in accordance with the ink-jet recording system.

As depicted in FIG. 1, the image recording apparatus 100 is provided with a casing 30. The casing 30 is provided with an upper casing 31 and a lower casing 32. Each of the upper casing 31 and the lower casing 32 generally has a rectangular parallelepiped shape as a whole, and each of the upper casing 31 and the lower casing 32 has a size capable of being placed on a table or a desk. That is, the image recording apparatus 100 is suitable for the use of being placed on the table or the desk. Of course, the image recording apparatus 100 may be used while being placed on a floor surface or a rack. Note that a frame may be appropriately provided to support respective members at the inside of the casing 30.

Figure 2:
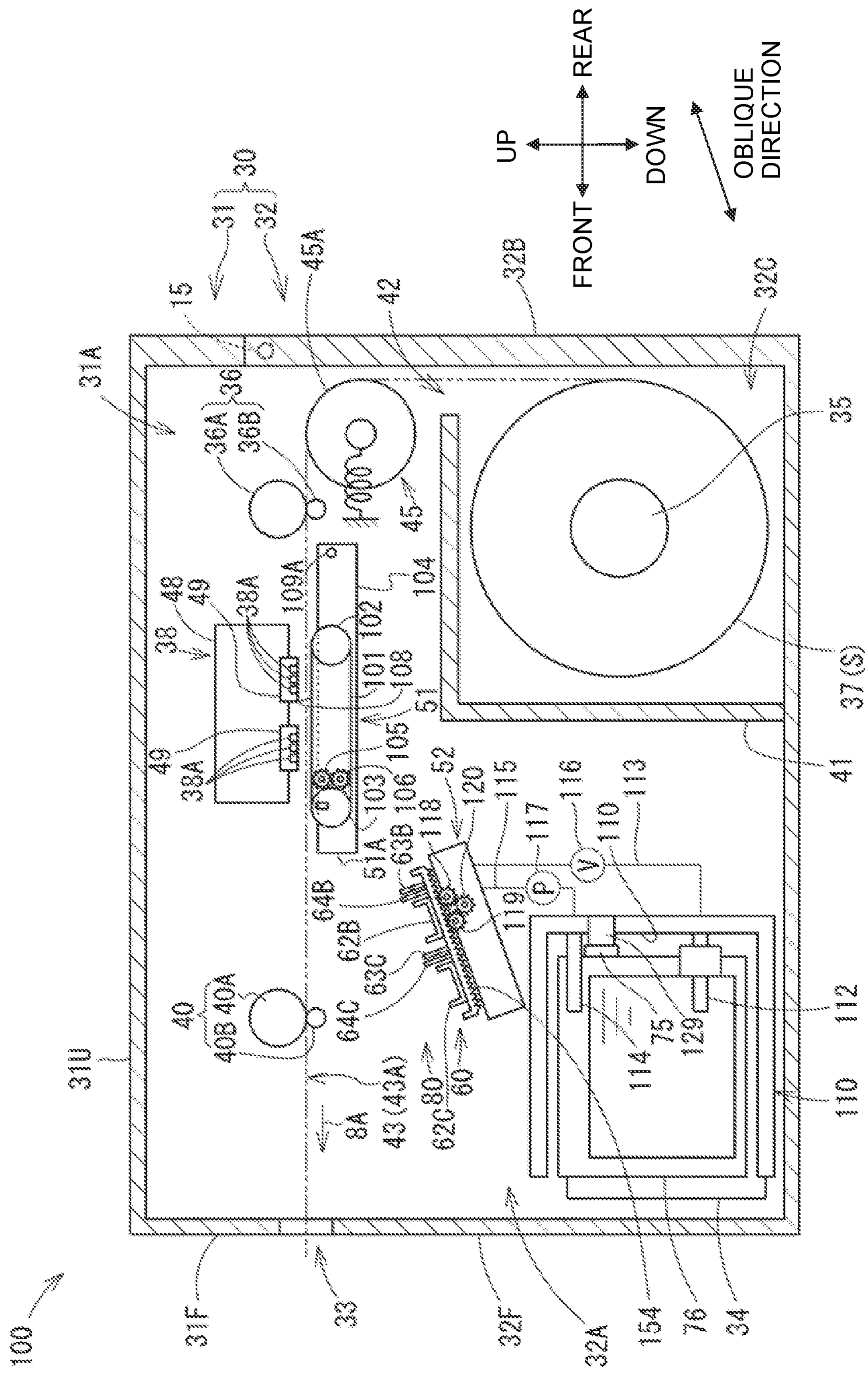
FIG. 2 is a sectional view illustrative of a cross section taken along II-II depicted in FIG. 1.

As depicted in FIG. 2, the upper casing 31 is supported rotatably by the lower casing 32. The upper casing 31 is rotatable to a closed position and an open position depicted in FIG. 2 about a rotation shaft 15 which is provided at a back lower end portion and which extends in the left-right direction. Note that the configuration to rotate the upper casing 31 is not limited to the configuration based on the rotation shaft 15. For example, the upper casing 31 may be rotatable by means of, for example, a hinge.

As depicted in FIG. 2, when the upper casing 31 is disposed at the closed position, an internal space 31A of the upper casing 31 and an internal space 32A of the lower casing 32 are shielded with respect to the outside. When the upper casing 31 is disposed at the open position, the internal space 31A of the upper casing 31 and the internal space 32A of the lower casing 32 are exposed with respect to the outside.

As depicted in FIG. 1, a slit-shaped discharge port 33, which is long in the left-right direction, is formed on a front surface 32F of the lower casing 32. The sheet S, on which the image has been recorded (see FIG. 2), is discharged from the discharge port 33.

An operation panel 44 is provided on a front surface 31F of the upper casing 31. An user performs the input with the operation panel 44 in order to operate the image recording apparatus 10 and determine various settings.

As depicted in FIG. 1, a front cover 39 is positioned on the front surface 32F of the lower casing 32. The front cover 39 can be opened so that the upper end side falls frontward about the rotation shaft (not depicted) extending in the left-right direction in the vicinity of the lower end. In accordance with the opening/closing of the front cover 39, for example, the cartridge installing unit 110 (see FIG. 2), which is positioned in the internal space 32A of the lower casing 32, is exposed or shielded.

<Exterior Configuration of Image Recording Apparatus 100>

The image recording apparatus 100 depicted in FIG. 1 (example of the liquid supply system) records an image on a sheet S which forms a roll member 37 (see FIG. 2) in accordance with the ink-jet recording system.

As depicted in FIG. 1, the image recording apparatus 100 is provided with a casing 30. The casing 30 is provided with an upper casing 31 and a lower casing 32. Each of the upper casing 31 and the lower casing 32 generally has a rectangular parallelepiped shape as a whole, and each of the upper casing 31 and the lower casing 32 has a size capable of being placed on a table or a desk. That is, the image recording apparatus 100 is suitable for the use of being placed on the table or the desk. Of course, the image recording apparatus 100 may be used while being placed on a floor surface or a rack. Note that a frame may be appropriately provided to support respective members at the inside of the casing 30.

As depicted in FIG. 2, the upper casing 31 is supported rotatably by the lower casing 32. The upper casing 31 is rotatable to a closed position and an open position depicted in FIG. 2 about a rotation shaft 15 which is provided at a back lower end portion and which extends in the left-right direction. Note that the configuration to rotate the upper casing 31 is not limited to the configuration based on the rotation shaft 15. For example, the upper casing 31 may be rotatable by means of, for example, a hinge.

As depicted in FIG. 2, when the upper casing 31 is disposed at the closed position, an internal space 31A of the upper casing 31 and an internal space 32A of the lower casing 32 are shielded with respect to the outside. When the upper casing 31 is disposed at the open position, the internal space 31A of the upper casing 31 and the internal space 32A of the lower casing 32 are exposed with respect to the outside.

As depicted in FIG. 1, a slit-shaped discharge port 33, which is long in the left-right direction, is formed on a front surface 32F of the lower casing 32. The sheet S, on which the image has been recorded (see FIG. 2), is discharged from the discharge port 33.

An operation panel 44 is provided on a front surface 31F of the upper casing 31. A user performs the input with the operation panel 44 in order to operate the image recording apparatus 10 and determine various settings.

As depicted in FIG. 1, a front cover 39 is positioned on the front surface 32F of the lower casing 32. The front cover 39 can be opened so that the upper end side falls frontward about the rotation shaft (not depicted) extending in the left-right direction in the vicinity of the lower end. In accordance with the opening/closing of the front cover 39, for example, the cartridge installing unit 110 (see FIG. 2), which is positioned in the internal space 32A of the lower casing 32, is exposed or shielded.

<Internal Configuration of Image Recording Apparatus 100>

As depicted in FIG. 2, those arranged in the internal spaces 31A, 32A include, for example, a holder 35, a tensioner 45, a conveying roller pair 36, a conveying roller pair 40, a head unit 38, a first support mechanism 51, a second support mechanism 52, an ink tank 34, a cleaning liquid (washing liquid) tank 76, and a maintenance mechanism 60.

Note that in the internal space 32A, for example, an unillustrated fixing unit, an image sensor, and a cutter are positioned on the downstream side in the conveying orientation 8A from the head unit 38. The fixing unit is a heater or an ultraviolet radiation device, which fixes the ink on the sheet S to the sheet S. When the fixing unit is the heater, the ink contains the resin which forms the film on the sheet S by means of the heat. When the fixing unit is the ultraviolet radiation device, the ink contains the resin which is cured by being irradiated with the ultraviolet light. The image sensor optically reads the image recorded on the sheet S, and the image data, which represents the reading result, is outputted to a controller. The cutter cuts the sheet S on which the image has been recorded.

A partition wall 41 is provided in the internal space 32A. The partition wall 41 partitions the back lower portion of the internal space 32A to compart a sheet accommodating space 32C. The sheet accommodating space 32C is the space which is surrounded by the partition wall 41 and the lower casing 32 and which is isolated, for example, from the head unit 38.

A roll member 37 is accommodated in the sheet accommodating space 32C. The roll member 37 has a core tube and the lengthy sheet S. The sheet S is wound around the core tube in a roll form in the circumferential direction of the axial center of the core tube. The sheet S may have a width ranging from the minimum width to the maximum width in which the image recording apparatus 100 can record the image. That is, a plurality of types of roll members 37, which has different widths, can be accommodated in the sheet accommodating space 32C. Note that it is also allowable that the roll member 37 does not have the core tube. The sheet S may be wound in a roll form so that the sheet S can be installed to the holder 35. Further, it is also appropriate that any fanfold paper can be accommodated in the sheet accommodating space 32C. As depicted in FIG. 1, a right cover 35A is positioned on a right surface 32R of the lower casing 32. For example, the holder 35, which is positioned in the sheet accommodating space 32C, is either exposed or shielded in accordance with the opening/closing of the right cover 35A.

As depicted in FIG. 2, the sheet accommodating space 32C is open upward at the back portion. In particular, a gap 42 is formed between the partition wall 41 and the back surface 32B, i.e., over or above the back end of the roll member 37. The sheet S is pulled out upward from the back end of the roll member 37 in accordance with the rotation of the conveying roller pairs 36, 40. The sheet S is guided to the tensioner 45 via the gap 42.

The tensioner 45 is positioned upward from the partition wall 41 at the back of the internal space 32A. The tensioner 45 has an outer circumferential surface 45A which is directed to the outer side of the lower casing 32. The outer circumferential surface 45A has the size which is not less than the maximum width of the sheet in the left-right direction. The outer circumferential surface 45A has the shape which is mutually symmetrical with respect to the paper passing center (center of the sheet S in the left-right direction). The upper end of the outer circumferential surface 45A is disposed at approximately the same vertical position as that of the nip position of the conveying roller pair 36 in the up-down direction.

The sheet S, which is pulled out from the roll member 37, is applied to the outer circumferential surface 45A, and the sheet S abuts against the outer circumferential surface 45A. The sheet S is curved frontward along the outer circumferential surface 45A to extend in the conveying orientation 8A, and the sheet S is guided by the conveying roller pair 36. The conveying orientation 8A is the front orientation along with the front-rear direction. The tensioner 45 applies the tension to the sheet S by means of the well-known technique.

The conveying roller pair 36 is positioned in front of the tensioner 45. The conveying roller pair 36 has a conveying roller 36A and a pinch roller 36B. The conveying roller 36A and the pinch roller 36B cause abutment at approximately the same vertical position as that of the upper end of the outer circumferential surface 45A.

The conveying roller pair 40 is positioned in front of the conveying roller pair 36. The conveying roller pair 40 has a conveying roller 40A and a pinch roller 40B. The conveying roller 40A and the pinch roller 40B cause abutment at approximately the same vertical position as that of the upper end of the outer circumferential surface 45A.

Each of the conveying rollers 36A, 40A is rotated by the driving force transmitted from an unillustrated motor. The conveying roller pair 36 is rotated while nipping the sheet S extending in the conveying orientation 8A from the tensioner 45, and thus the sheet S is sent out in the conveying orientation 8A along with the conveying surface 43A. The conveying roller pair 40 is rotated while nipping the sheet S sent out from the conveying roller pair 36, and thus the sheet S is sent out in the conveying orientation 8A. Further, the sheet S passes through the gap 42 from the sheet accommodating space 32C, and the sheet S is pulled out toward the tensioner 45 in accordance with the rotation of the conveying roller pairs 36, 40.

As depicted in FIG. 2, a conveying passage 43, which ranges from the upper end of the outer circumferential surface 45A to arrive at the discharge port 33, is formed in the internal space 32A. The conveying passage 43 extends approximately in a straight form along with the conveying orientation 8A. The conveying passage 43 is the space through which the sheet S can pass. In particular, the conveying passage 43 extends along a conveying surface 43 which spreads in the conveying orientation 8A and in the left-right direction and which is long in the conveying orientation 8A. Note that in FIG. 2, the conveying surface 43A is depicted by a two-dot chain line which indicates the conveying passage 43. The conveying passage 43 is comparted, for example, by a conveying belt 101, the head unit 38, and guide members (not depicted) positioned while being separated from each other in the up-down direction.

The head unit 38 is positioned on the downstream side in the conveying orientation 8A from the conveying roller pair 36 over or above the conveying passage 43. The head unit 38 has a head module 49 which has a plurality of nozzles 38A. The ink is ejected from the plurality of nozzles 38A downward toward the sheet S supported by the conveying belt 101. Accordingly, the image is recorded on the sheet S.

The first support mechanism 51 is positioned downstream in the conveying orientation 8A from the conveying roller pair 36 under or below the conveying passage 43. The first support mechanism 51 is opposed to the head unit 38 under or below the head unit 38. The first support mechanism 51 has the conveying belt 101 and a support unit 104. The conveying belt 101 supports the sheet S which is conveyed in the conveying orientation 8A by the conveying roller pair 36 and which is positioned just under the head unit 38. The conveying belt 101 conveys the supporting sheet S in the conveying orientation 8A. The support unit 104 can support the maintenance mechanism 60.

The second support mechanism 52 is positioned under or below the conveying roller pair 40. The second support mechanism 52 is fixed at the inside of the lower casing 32 by being supported by the lower casing 32. The second support mechanism 52 can support the maintenance mechanism 60.

The ink tank 34 stores the ink. The ink is a liquid containing, for example, a pigment. The ink has a viscosity which is appropriate to uniformly disperse the pigment. The pigment forms the color of the ink. The ink is supplied from the ink tank 34 via an unillustrated tube to the head unit 38.

The cleaning liquid tank 76 stores a cleaning liquid (washing liquid). The cleaning liquid is used when the nozzles 38A of the head unit 38 is cleaned (washed). The cleaning liquid tank 76 is also used to store, as a waste liquid, the cleaning liquid with which the nozzles 38A have been cleaned. Detailed configuration of the cleaning liquid tank 76 will be described later on.

The cartridge installing unit 110 is positioned in the vicinity of the front end and the lower end of the lower casing 32. The cartridge installing unit 110 has a box-shaped form which is open while being directed frontward. The cleaning liquid tank 76 is inserted backward (in the back orientation) into the cartridge installing unit 110. A supply needle 112, which extends frontward, is positioned on a backward oriented terminal surface 111 of the cartridge installing unit 110. The front end of the supply needle 112 is open, and the back end thereof is connected to a flow passage 113. The flow passage 113 is connected to a supply tube 175 described later on. A valve 116, which opens/closes the flow passage 113, is positioned in the flow passage 113. A discharge needle 114, which extends frontward, is positioned on the backward oriented terminal surface 111 of the cartridge installing unit 110. The front end of the discharge needle 114 is open, and the back end thereof is connected to a flow passage 115. The flow passage 115 is connected to a waste liquid tube 178 described later on. A suction pump 117 is positioned in the flow passage 113.

Note that an installation case, which is the same as or equivalent to the cartridge installing unit 110, is also provided for the ink tank 34. However, any detailed explanation thereof is omitted herein. The ink tank 34 stores the ink. The ink is a liquid containing, for example, a pigment. The ink has a viscosity which is appropriate to uniformly disperse the pigment. The pigment forms the color of the ink. When the ink is consumed, then the ink tank 34 is removed from the cartridge installing unit, and the ink tank 34 is exchanged with a new ink tank 34 which stores the ink.

The maintenance mechanism 60 is provided in order to perform the maintenance for the head unit 38. The maintenance mechanism 60 is configured to be movable. The maintenance mechanism 60 is moved to the position disposed just under the head unit 38 when the maintenance is performed for the head unit 38 (see FIG. 5).

Figure 5:
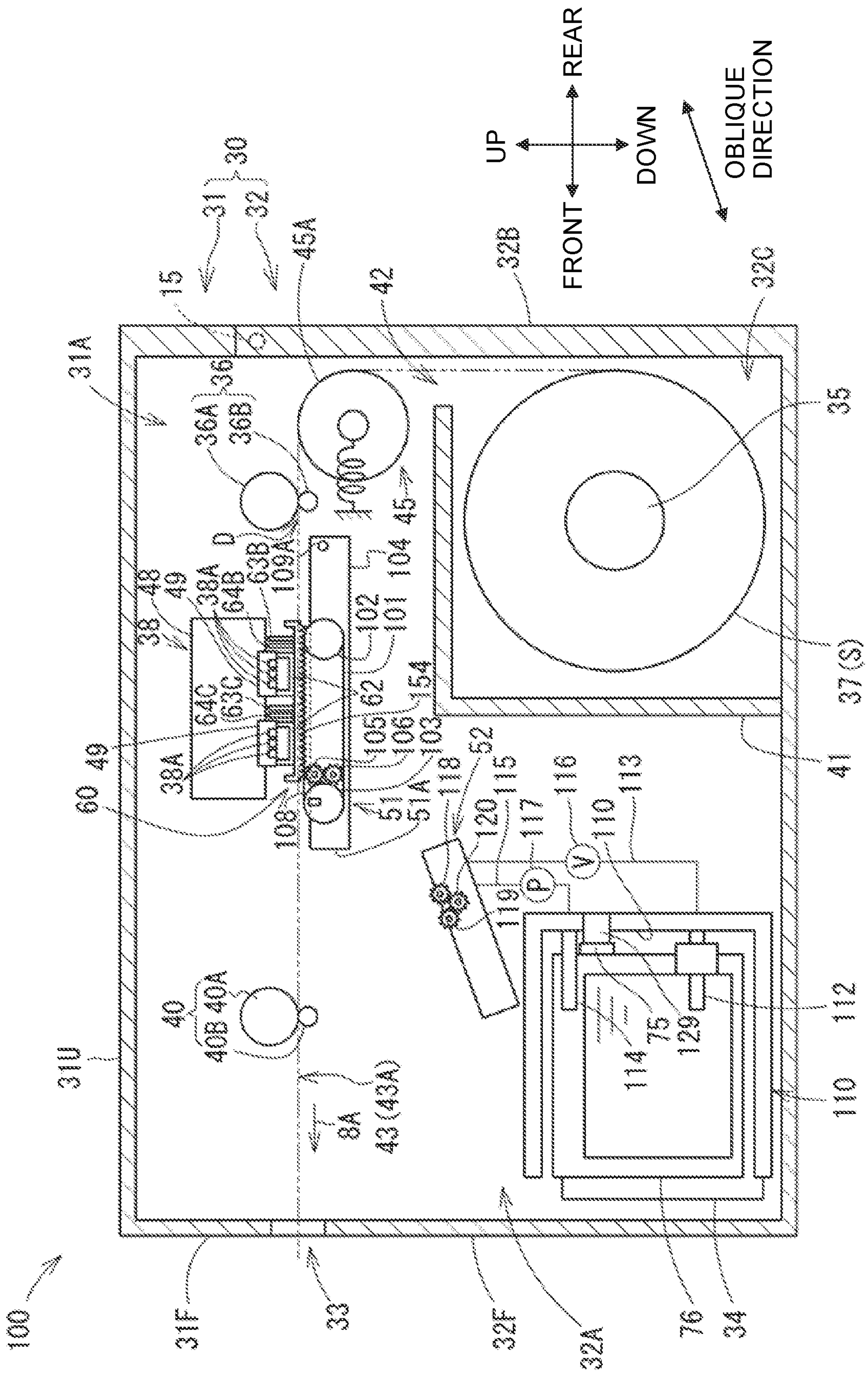
FIG. 5 is a sectional view illustrative of a cross section taken along II-II depicted in FIG. 1, illustrating a state in which the first support mechanism 51 is disposed at a first rotation position and the maintenance mechanism 60 is disposed at a maintenance position.

The maintenance for the head unit 38 includes, for example, the purge process, the immersion process, and the wiping process. As depicted in FIG. 5, the purge process is such a process that the ink is sucked from the nozzles 38A by means of the suction pump after covering the nozzles 38A with a cap 62 of the maintenance mechanism 60. The immersion process is such a process that the nozzles 38A are immersed in the cleaning liquid supplied to the cap 62 in a state in which the nozzles 38A are covered with the cap 62. The wiping process is such a process that the lower surface 50 of the head module 49 of the head unit 38 is wiped out by means of a sponge wiper 64 and a rubber wiper 63 of the maintenance mechanism 60.

<Maintenance Mechanism 60>

Figure 3:
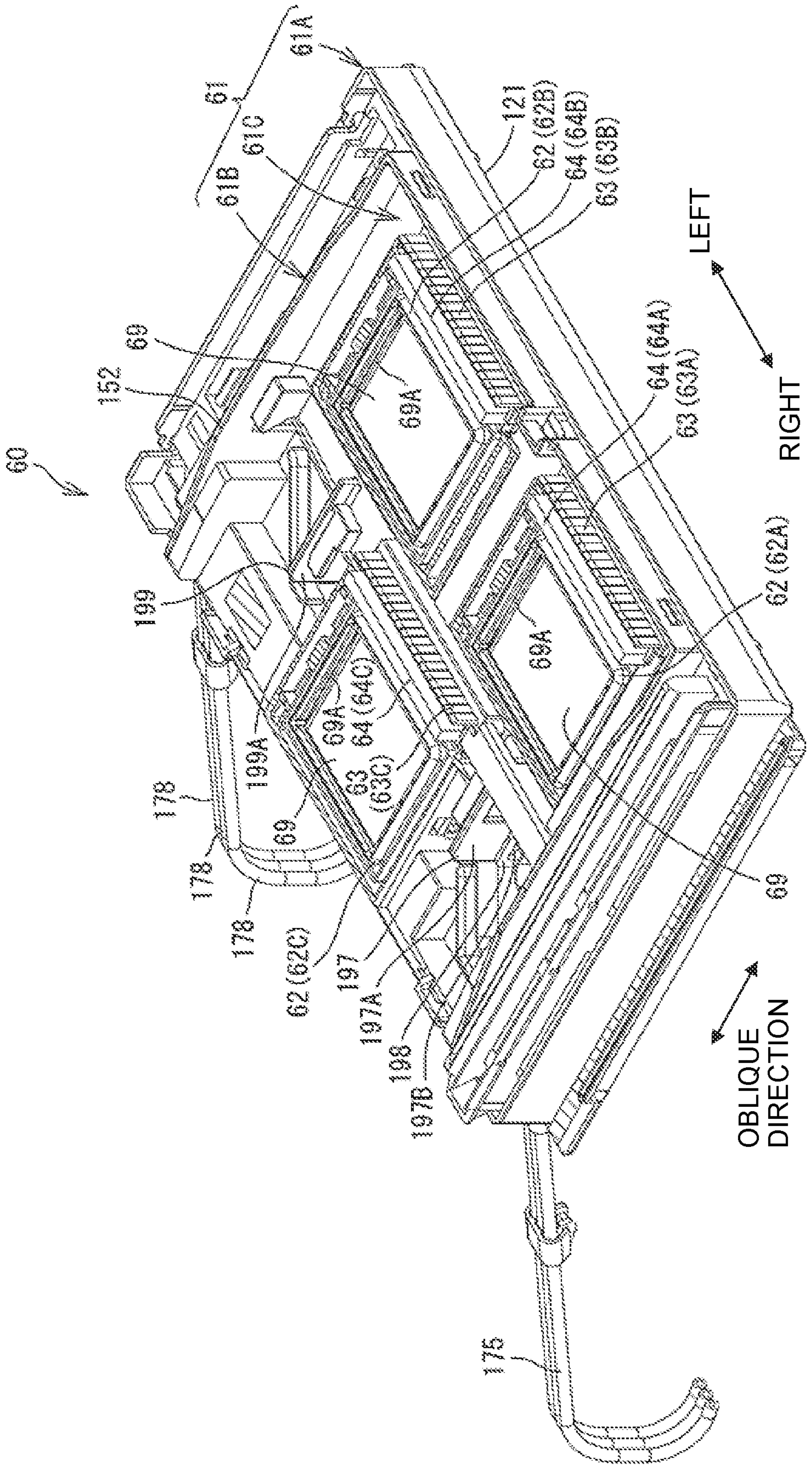
FIG. 3 is a perspective view of a maintenance mechanism 60.

As depicted in FIG. 3, the maintenance mechanism 60 is provided with a support member 61, the sponge wiper 64, the rubber wiper 63, and the cap 62. Note that in the following explanation of the maintenance mechanism 60, it is assumed that the maintenance mechanism 60 is supported by the second support mechanism 52.

<Support Member 61>

The support member 61 has a bottom base 61A, a main body 61B which is placed on the bottom base 61A, and a wiper holder 61C which retains the sponge wiper 64 and the rubber wiper 63 on the main body 61B. The bottom base 61A has a box-shaped form in which the upper portion is open.

The lower surface 121 of the bottom base 61A can abut against the upper surface of the first support mechanism 51 from the upper position. Accordingly, the maintenance mechanism 60 can be supported by the first support mechanism 51. Further, the lower surface 121 can abut against the upper surface of the second support mechanism 52 from the upper position. Accordingly, the maintenance mechanism 60 can be supported by the second support mechanism 52.

The bottom base 61A is provided with a rack 154 (see FIG. 2). The rack 154 is formed at the right end of the lower surface 121 of the bottom base 61A. The rack 154 can be meshed with a gear 105. The gear 105 is rotated in a state in which the rack 154 is meshed with the gear 105, and thus the maintenance mechanism 60 slides in the front-rear direction with respect to the first support mechanism 51.

The rack 154 can be meshed with a gear 118 and a gear 119. The gear 105 is rotated in a state in which the rack 154 is meshed with at least one of the gear 118 and the gear 119, and thus the maintenance mechanism 60 slides in the front-rear direction with respect to the second support mechanism 52.

Accordingly, the maintenance mechanism 60 is movable to the waiting position depicted in FIG. 2 and the maintenance position depicted in FIG. 5. At the maintenance position and the wiping position, the maintenance mechanism 60 is opposed in the up-down direction to the lower surface 50 of the head module 49 of the head unit 38.

The main body 61B has a substantially box-shaped form in which the upper portion is open. The main body 61B is smaller than the bottom base 61A. The main body 61B is fixed to the bottom base 61A in a state in which the main body 61B is placed on the bottom base 61A. The main body 61B is formed with the flow passage through which the cleaning liquid stored in the cleaning liquid tank 76 can flow. The cleaning liquid is supplied to the flow passage from the cleaning liquid tank 76 via the supply tube 175. The cleaning liquid is discharged from the flow passage to the cleaning liquid tank 76 via the waste liquid tube 178. The cleaning liquid is supplied to the sponge wiper 64 via the flow passage.

The wiper holder 61C holds three sponge wipers 64A, 64B, 64C, three rubber wipers 63A, 63B, 63C, and three caps 62A, 62B, 63C respectively. The sponge wiper 64 is formed of sponge which is a porous member that absorbs and retains the liquid. In this embodiment, the three sponge wipers 64 (64A, 64B, 64C) are provided. Note that the number of the sponge wipers 64 is not limited to three. The number is set in conformity with the number of the head modules 49 of the head unit 38 described above. In the following description, the three sponge wipers 64A, 64B, 64C are also generally named and referred to as "sponge wiper 64". The sponge wiper 64 has a rectangular parallelepiped shape in which the length in the left-right direction is longer than the lengths in the oblique direction and the up-down direction. The length in the up-down direction of the sponge wiper 64 is longer than the length in the oblique direction. The lower portion of the sponge wiper 64 enters the interior of the flow passage of the main body 61B.

The rubber wiper 63 is formed of rubber which is an elastic member that neither absorbs nor retains the liquid. In this embodiment, the three rubber wipers 63 (63A, 63B, 63C) are provided. Note that the number of the rubber wipers 63 is not limited to three. The number is set in conformity with the number of the head modules 49 of the head unit 38 described above. In the following description, the three rubber wipers 63A, 63B, 63C are also generally named and referred to as "rubber wiper 63".

The rubber wiper 63 is formed to have a flat plate-shaped form which spreads in the up-down direction and the left-right direction. The length in the oblique direction of the rubber wiper 63 is shorter than the length in the oblique direction of the sponge wiper 64. Accordingly, the rubber wiper 63 is easily bent when the rubber wiper 63 abuts against the lower surface 50 of the head module 49 during the wiping process. The length in the left-right direction of the rubber wiper 63 is slightly longer than the length in the left-right direction of the sponge wiper 64.

The cap 62 is composed of an elastic member such as rubber, silicon or the like. The cap 62 has a box-shaped form in which the upper portion is open. In this embodiment, the cap 62 is composed of three caps 62A, 62B, 62C. Note that the number of the caps 62 is not limited to three. The number is set in conformity with the number of the head modules 49 of the head unit 38 described above. In the following description, the three caps 62A, 62B, 62C are also generally named and referred to as "cap 62".

A bottom plate 69 of the cap 62 is formed with an inflow port (not depicted) through which the cleaning liquid inflows into the cap 62 and an outflow port 69A through which the cleaning liquid outflows from the cap 62. One end of the supply tube 175 is connected to the inflow port. The other end of the supply tube 175 is connected to the cleaning liquid tank 76. One end of the waste liquid tube 178 is connected to the outflow port. The other end of the waste liquid tube 178 is connected to the cleaning liquid tank 76. When the suction pump 117 is driven, the liquid is sucked thereby from the outflow port 69A of the cap 62 to the cleaning liquid tank 76.

<Movement of Maintenance Mechanism 60>

The maintenance mechanism 60 slides with respect to the second support mechanism 52 in a state in which the maintenance mechanism 60 is supported by the second support mechanism 52, and thus the maintenance mechanism 60 is movable to the waiting position and the cleaning termination position along with the oblique direction.

As depicted in FIG. 2, the maintenance mechanism 60, which is disposed at the waiting position, is positioned in front of (downstream in the conveying orientation 8A from) the rotation forward end 51A of the first support mechanism 51. In other words, the maintenance mechanism 60, which is disposed at the waiting position, is positioned oppositely to the shaft 109A of the first support mechanism 51 with respect to the rotation forward end 51A of the first support mechanism 51. The maintenance mechanism 60, which is disposed at the waiting position, is supported by the second support mechanism 52. In this situation, the rack 154 is meshed with the gears 118, 119.

The maintenance mechanism 60 is delivered between the second support mechanism 52 and the first support mechanism 51 disposed at the second rotation position, and thus the maintenance mechanism 60 is movable to the waiting position and the maintenance position. The waiting position is the position retracted from the maintenance position.

Figure 4:
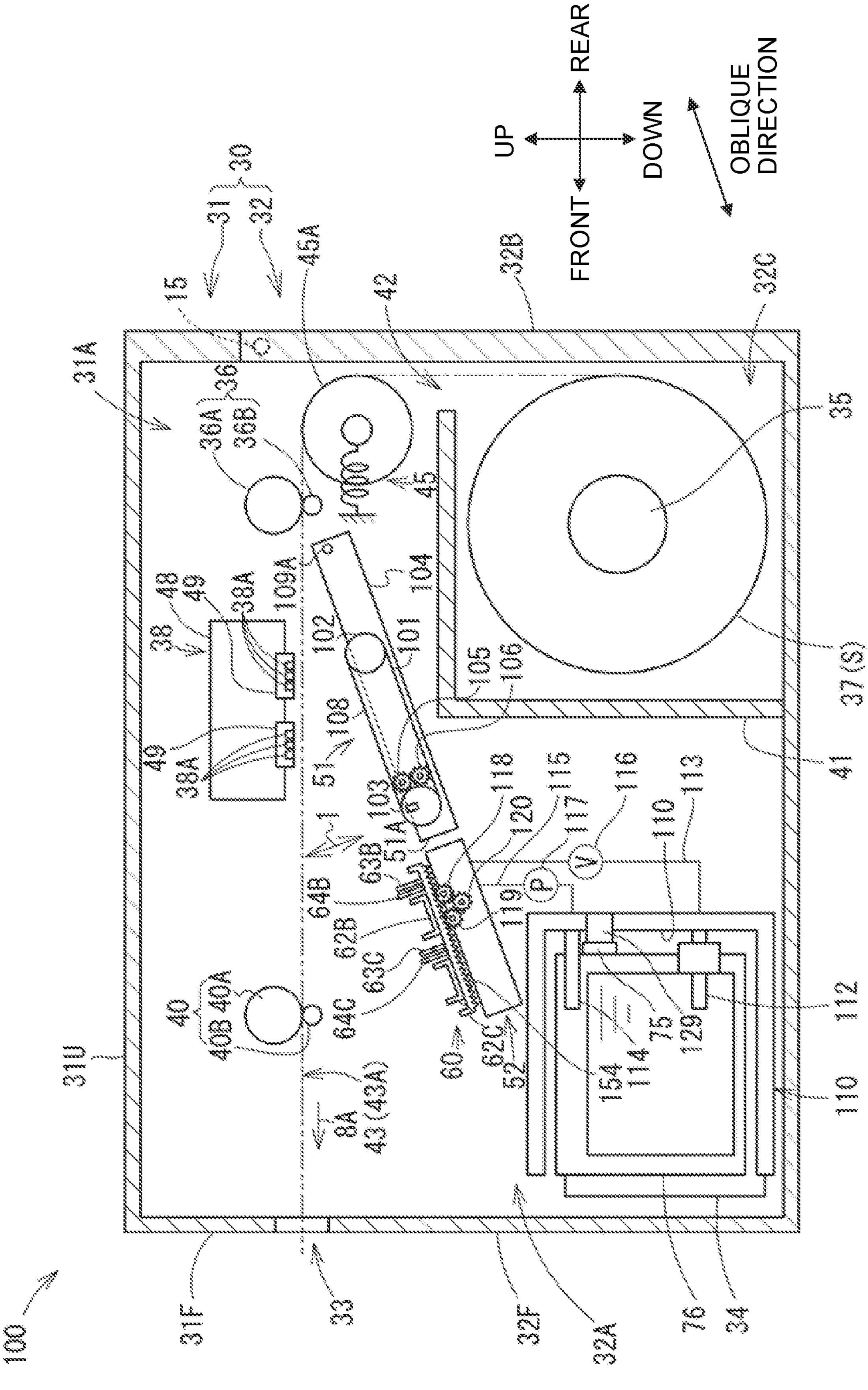
FIG. 4 is a sectional view illustrative of a cross section taken along II-II depicted in FIG. 1, illustrating a state in which a first support mechanism 51 is disposed at a second rotation position and the maintenance mechanism 60 is disposed at a waiting position.

The unillustrated motor is driven, and the first support mechanism 51 is disposed at the second rotation position as depicted in FIG. 4. When the motor is driven in this state, and the gear 120 is rotated counterclockwise as viewed in FIG. 4, then the gears 118, 119 are rotated clockwise as viewed in FIG. 4. Accordingly, the maintenance mechanism 60, which is disposed at the waiting position, is moved backward in the oblique direction.

The motor is driven in the state in which the maintenance mechanism 60 is supported by only the first support mechanism 51, and thus the first support mechanism 51 is rotated from the second rotation position to the first rotation position. Accordingly, as depicted in FIG. 5, the maintenance mechanism 60 is positioned at the maintenance position. The maintenance mechanism 60, which is disposed at the maintenance position, is positioned between the head unit 38 and the first support mechanism 51 disposed at the first rotation position. Note that when the maintenance mechanism 60 is moved from the maintenance position to the waiting position, the operation, which is reverse to the above, is executed.

The maintenance mechanism 60 is moved in the front-rear direction with respect to the first support mechanism 51 in a state in which the maintenance mechanism 60 is supported by the first support mechanism 51 disposed at the first rotation position, and thus the maintenance mechanism 60 can be moved to the maintenance position and the wiping position. The wiping position is the position disposed in front of the maintenance position (on the side of the waiting position). In other words, the first support mechanism 51 can support the maintenance mechanism 60 which is positioned at the maintenance position, at the wiping position, and between the foregoing both positions.

<Image Recording Process>

A process (image recording process), which is executed when the image is recorded on the sheet S, will be explained below.

When the image recording process is not executed, the image recording apparatus 100 is in the waiting state. In the waiting state, as depicted in FIG. 5, the head unit 38 is positioned at the position subjected to the capping, the first support mechanism 51 is positioned at the first rotation position in the state in which the maintenance mechanism 60 is supported, and the maintenance mechanism 60 is positioned at the maintenance position. In this situation, the cap 62 covers the nozzles 38A.

If the controller of the image recording apparatus 100 receives the command to record the image on the sheet S from the operation panel 44 or from the outside including, for example, any information processing apparatus connected to the image recording apparatus 100 via LAN or the like, the maintenance mechanism 60 is moved from the maintenance position to the waiting position. Then, the first support mechanism 51 is rotated from the second rotation position to the first rotation position.

Subsequently, the conveyance of the sheet S is started. The ink is ejected from the nozzles 38A in a state in which the sheet S is positioned just under the head unit 38. Accordingly, the image is recorded on the sheet S.

<Purge Process>

A purge process, in which the ink is sucked from the nozzles 38A, will be explained below.

When the image recording process is not executed, the image recording apparatus 100 is in the waiting state. In the waiting state, as depicted in FIG. 5, the first support mechanism 51 is positioned at the first rotation position in the state in which the maintenance mechanism 60 is supported, and the maintenance mechanism 60 is positioned at the maintenance position. In this situation, the cap 62 covers the nozzles 38A.

The purge process is executed, for example, at a predetermined timing in the waiting state, or if a command is received from the outside. In the following description, a process will be explained, which is executed if the controller accepts the command to execute the purge process when the image recording apparatus 100 is in the waiting state.

When the suction pump 117 is driven in the purge process, then the ink contained in the nozzles 38A is sucked, and the ink is discharged to the cleaning liquid tank 76 via the waste liquid tube 178 from the space formed by the cap 62 and the lower surface 50 of the head module 49. Accordingly, any clog-up of the nozzle 38A is avoided, which would be otherwise caused by the solidification of the ink.

<Wiping Process>

After the purge process, a wiping process is executed, in which the sponge wiper 64 and the rubber wiper 63 wipe out the lower surface 50 of the head module 49 of the head unit 38. The head unit 38 is moved upward, and thus the cap 62 is separated from the lower surface of the head module 49.

Subsequently, the unillustrated suction pump is driven, and the cleaning liquid is supplied to the sponge wiper 64 via the supply tube 175 from the cleaning liquid tank 76.

Subsequently, the maintenance mechanism 60 is moved from the maintenance position to the wiping position. During the process in which the maintenance mechanism 60 is moved from the maintenance position to the wiping position, the forward end portions (upper end portions) of the sponge wiper 64 and the rubber wiper 63 slide on the lower surface 50 while abutting against the lower surface 50 of the head module 49. Accordingly, the lower surfaces 50 of the respective head modules 49A, 49B, 49C are wiped out. As a result, for example, the liquid and foreign matters, which adhere to the lower surfaces 50, are removed.

<Cap Process>

The suction pump 117 is driven in the cap process, and thus the cleaning liquid is supplied from the cleaning liquid tank 76 via the supply tube 175 to the caps 62A, 62B, 62C. After that, the head unit 38 is moved downward, and thus the cap 62 abuts against the lower surface 50 of the head module 49. Accordingly, the nozzles 38A are disposed in the space in which the cleaning liquid exists. Therefore, the ink is hardly dried in the nozzles 38A. The head unit 38 is moved downward, and thus the cap 62 is separated from the lower surface of the head module 49. In this situation, the cleaning liquid, which is contained in the caps 62A, 62B, 62C, is discharged to the cleaning liquid tank 76.

<Cartridge Installing Unit 110>

Figure 6:
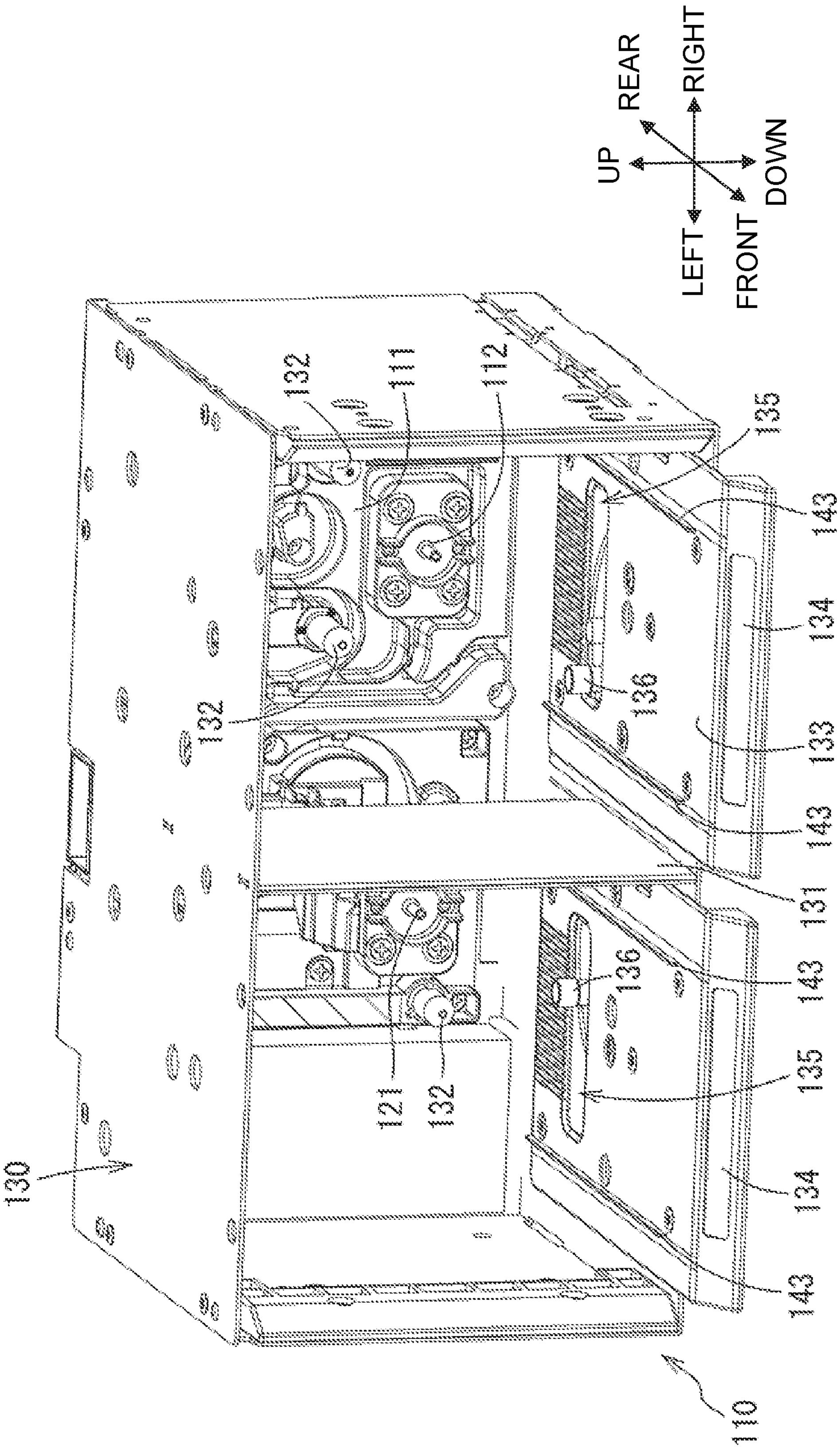
FIG. 6 is a perspective view of a cartridge installing unit 110.

As depicted in FIG. 6, the cartridge installing unit 110 has a case 130 which is open in the front orientation (example of the removal orientation) of the front-rear direction. The case 130 has a partition plate 131 which partitions the internal space in the left-right direction. The cleaning liquid tank 76 is inserted into the right part of the internal space of the case 130 partitioned by the partition plate 131, and the ink tank 34 is inserted into the left part thereof. An explanation will be made below about the configuration of the internal space disposed on the right side into which the cleaning liquid tank 76 is inserted.

The supply needle 112 and the discharge needle 114 (see FIG. 2) extend frontward on the terminal surface 111 of the case 130. Note that the discharge needle 114 is positioned on the upper side of the terminal surface 111, and the discharge needle 114 does not appear in FIG. 6. Two positioning bosses 132 are positioned over or above the supply needle 112 while being separated from each other in the left-right direction. The positioning boss 132 has a columnar shape which protrudes frontward.

A guide surface 134 is positioned in front of a bottom surface 133 of the case 130. The guide surface 134 extends frontward and downward from the front end of the bottom surface 133. The cleaning liquid tank 76, which is to be inserted into the case 130, is guided to the bottom surface 133 by the guide surface 134.

Two guide ribs 143, which extend in the front-rear direction, are positioned while being separated from each other in the left-right direction on the bottom surface 133 of the case 130. The guide rib 143 protrudes upward from the bottom surface 133. The space between the two guide ribs 143 is slightly larger than the dimension or size in the left-right direction of the cleaning liquid tank 76. The cleaning liquid tank 76, which is positioned on the bottom surface 133, is guided in the front-rear direction as the movement direction between the two guide ribs 143.

A through-hole 135, which extends in the left-right direction, is positioned in the vicinity of the terminal surface 111 of the bottom surface 133 of the case 130. The through-hole 135 penetrates in the up-down direction through the bottom surface 133 of the case 130. A latch 136 is positioned in the through-hole 135. The latch 136 is movable in the left-right direction in the through-hole 135.

Figure 7:
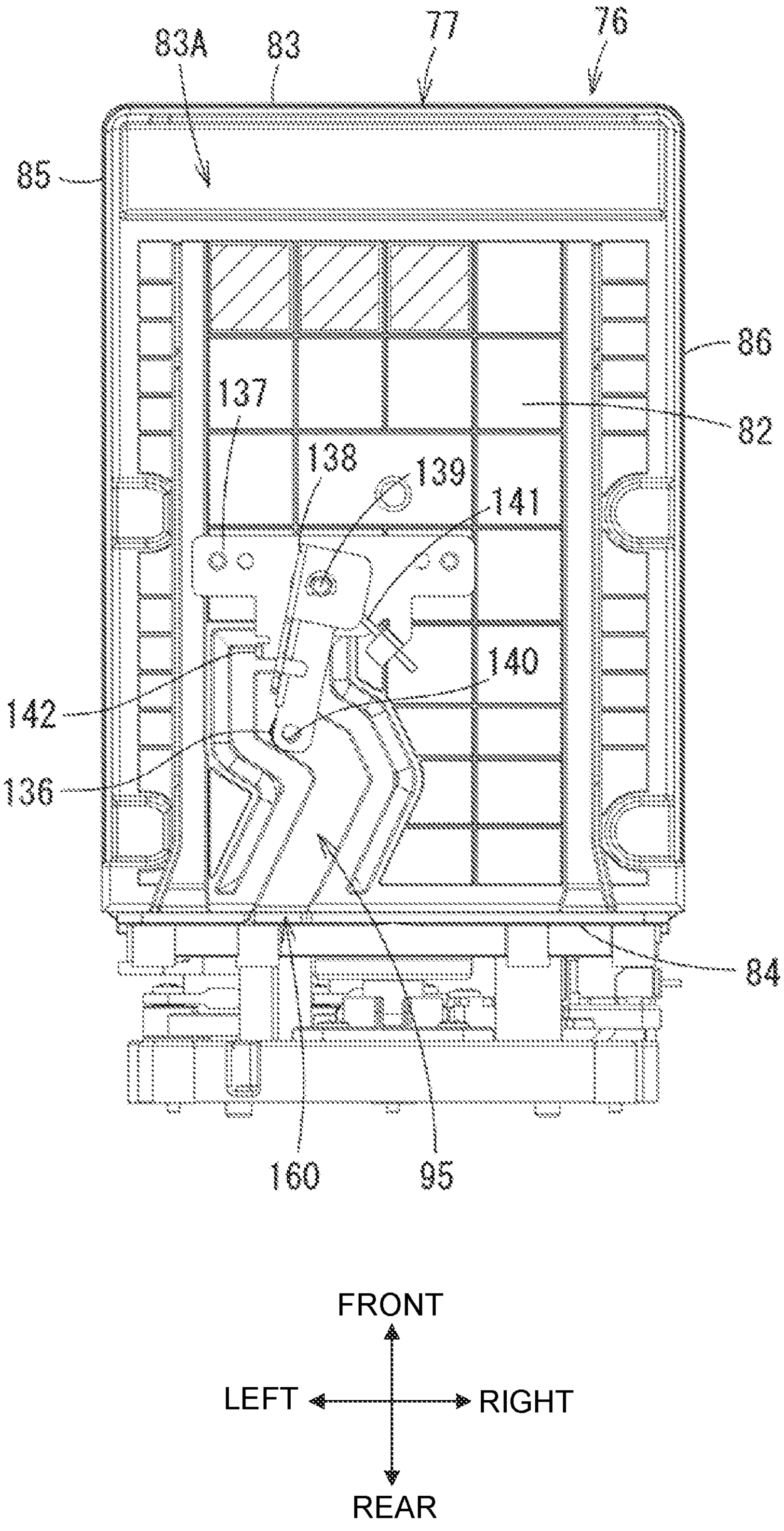
FIG. 7 is a bottom view illustrative of a support plate 137 and a rotatable member 138.

As depicted in FIG. 6, the latch 136 has a columnar shape having the axis in the up-down direction. As depicted in FIG. 7, the latch 136 is connected to the case 130 by means of a rotatable member 138 and a support plate 137 attached to the lower surface of the case 130. The support plate 137 is fixed to the lower surface of the case 130. Note that the case 130 is omitted in FIG. 7. The support plate 137 has a shaft 139 which extends in the up-down direction. The rotatable member 138 is connected to the shaft 139 rotatably in a predetermined range. The rotation range of the rotatable member 138 is regulated by a stopper 142 which is folded and bent downward with respect to the support plate 137. A shaft 140, which extends in the up-down direction, is connected to the rotation forward end side of the rotatable member 138. The latch 136 is rotatably connected to the shaft 140. A torsion coil spring 141 (example of the elastic member) is provided between the support plate 137 and the rotatable member 138. The torsion coil spring 141 urges the rotatable member 138 clockwise as viewed in FIG. 7. The torsion coil spring 141 generally urges the rotatable member in the left orientation of the left-right direction within the rotation range of the rotatable member 138.

Note that although any detailed explanation is omitted, an ink needle 121, guide ribs 143, positioning bosses 132, a guide surface 134, a through-hole 135, and a latch 136 are also positioned in the left internal space of the internal space of the case 130 in the same manner as described above. The ink needle 121, the guide ribs 143, the positioning bosses 132, the guide surface 134, the through-hole 135, and the latch 136, which are positioned on the right side of the internal space of the case 130, correspond to the ink tank 34.

<Cleaning Liquid Tank 76>

The cleaning liquid tank 76 (example of the liquid cartridge) stores the cleaning liquid. The cleaning liquid is a liquid containing, for example, an organic solvent, a surfactant, and water. The cleaning liquid tank 76 also serves as a space for storing the waste liquid. The cleaning liquid is stored in a pouch 90 in the cleaning liquid tank 76. The waste liquid is stored in a main case body 77 (example of the casing) at the outside of the pouch 90. When the cleaning liquid is consumed, and/or the main case body 77 is filled with the waste liquid, then the cleaning liquid tank 76 is removed from the cartridge installing unit 110, and the cleaning liquid tank 76 is exchanged with a new cleaning liquid tank 76.

As depicted in FIG. 8 to FIG. 12, the cleaning liquid tank 76 has the main case body 77, a cover 78, a film 79, and the pouch 90. Note that the following explanation will be made while the up-down direction, the front-rear direction, and the left-right direction of the cleaning liquid tank 76 are adjusted to the respective directions of the casing 30 in the state in which the cleaning liquid tank 76 is installed to the cartridge installing unit 110. The main case body 77, the cover 78, and the film 79 are examples of the case.

The main case body 77 has a box-shaped form having an opening 81 which is directed upward. The main case body 77 has a lower wall 82, a front wall 83, a back wall 84, a left wall 85, and a right wall 86. The lower wall 82 has a rectangular shape which is long in the front-rear direction as viewed in the up-down direction. The front wall 83 extends upward from the front end of the lower wall 82. The front wall 83 is formed with a recess 83A which is recessed backward. The recess 83A is also open on the lower wall 82. The recess 83A serves as a handle when a user pulls out the main case body 77. The back wall 84 extends upward from the back end of the lower wall 82. The outer surface of the back wall 84 is the front surface in the installation orientation.

The left wall 85 extends upward from the left end of the lower wall 82, and the left wall 85 connects the front wall 83 and the back wall 84. The right wall 86 extends upward from the right end of the lower wall 82, and the right wall 86 connects the front wall 83 and the back wall 84.

Figure 11:
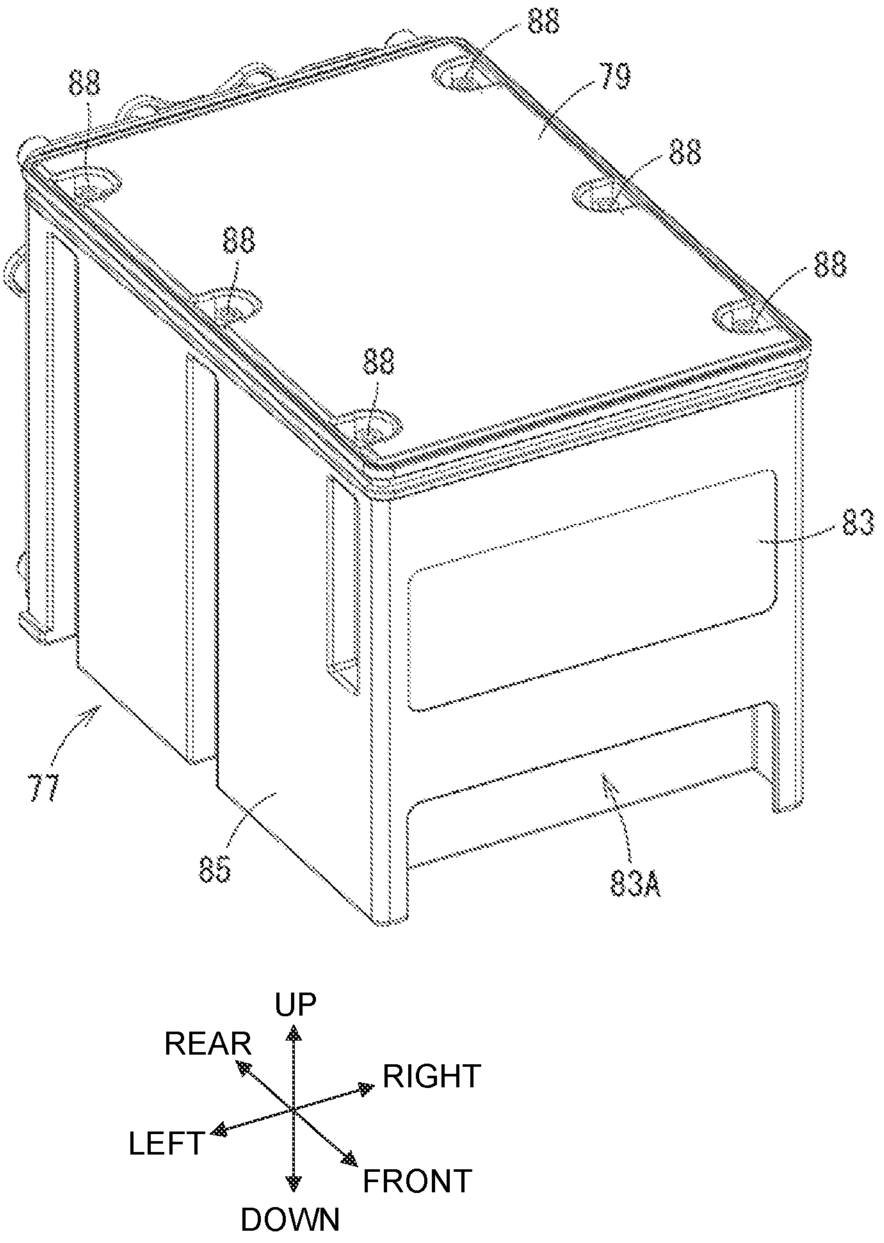
FIG. 11 is a perspective view illustrative of a main case body 77 and a film 79.
Figure 12:
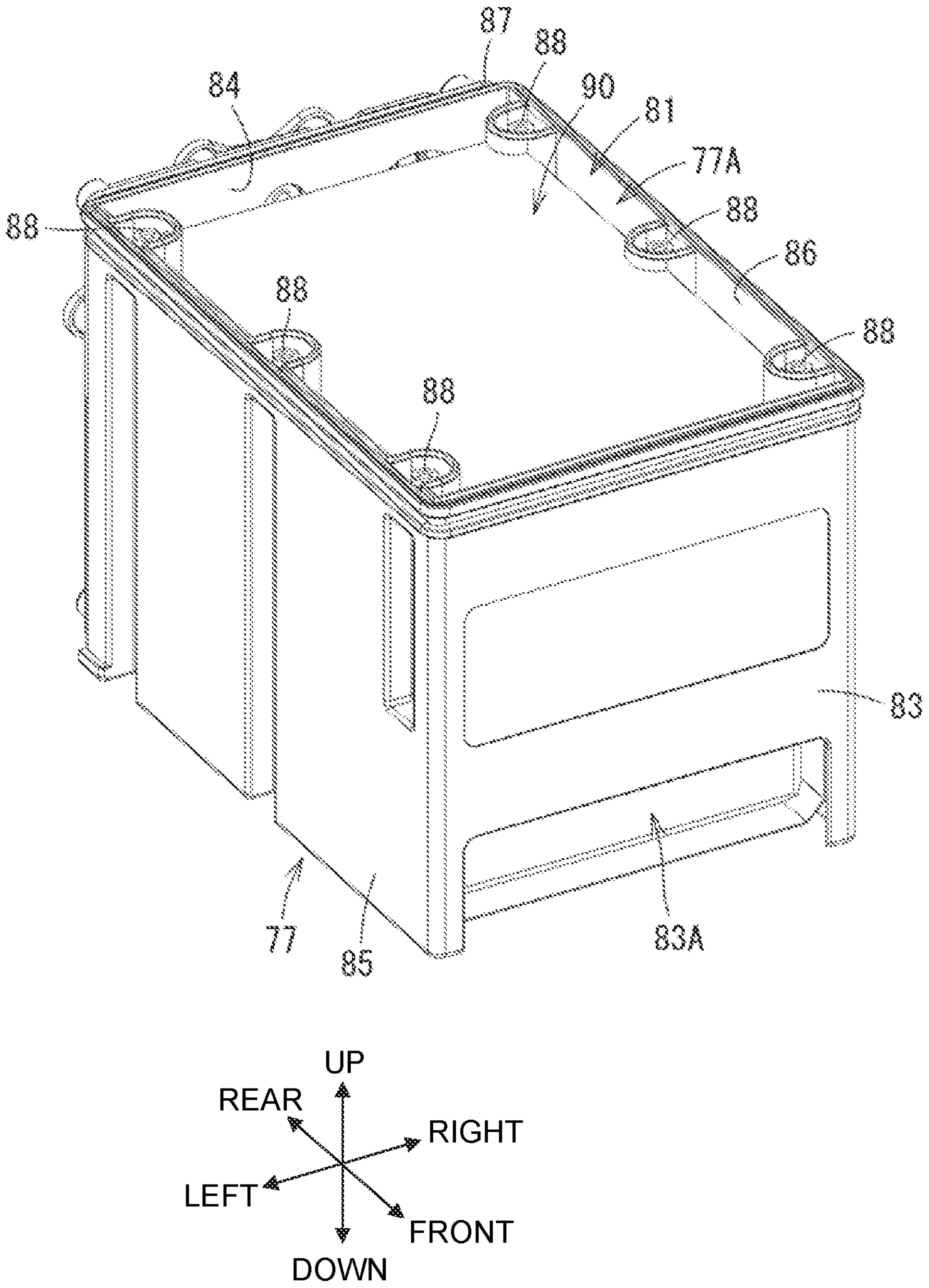
FIG. 12 is a perspective view illustrative of the main case body 77.

As depicted in FIG. 12, the opening 81 is comparted by the upper end of the front wall 83, the upper end of the back wall 84, the upper end of the left wall 85, and the upper end of the right wall 86. The internal space of the main case body 77 is exposed to the outside via the opening 81. The internal space of the main case body 77 is a storage chamber 77A. A welding surface 87, which is provided in order to weld the film 79, is positioned at the upper end of the front wall 83 for comparting the opening 81, the upper end of the back wall 84, the upper end of the left wall 85, and the upper end of the right wall 86. The welding surface 87 has a rectangular shape to surround the opening 81. As depicted in FIG. 11, the film 79 is welded to the welding surface 87, and thus the opening 81 is sealed in a liquid-tight manner.

Two arrays of screw holes 88, each of which includes three screw holes 88 aligned in the front-rear direction, are positioned on the outer side of the welding surface 87, while being separated from each other in the left-right direction. In other words, the three screw holes 88 are aligned in the front-rear direction at the upper end of the left wall 85, and the three screw holes 88 are aligned in the front-rear direction at the upper end of the right wall 86.

The film 79, which is welded to the main case body 77, is covered with the cover 78. The cover 78 has a rectangular flat plate-shaped form abutting against the upper end of the front wall 83, the upper end of the back wall 84, the upper end of the left wall 85, and the upper end of the right wall 86. Two arrays of through-holes 89, each of which includes three through-holes 89 aligned in the front-rear direction, are positioned through the cover 78, while being separated from each other in the left-right direction. The arrangement of the through-holes 89 corresponds to the arrangement of the screw holes 88. Screws 99 are inserted into and screw-engaged with the through-holes 89 and the screw holes 88 in the state in which the cover 78 covers the film 79, and thus the cover 78 is fixed to the main case body 77.

Three openings are formed on the back wall 84 of the main case body 77, and the spouts 70, 71, 92 are fitted to the respective openings. The spout 70 has an atmospheric air communication hole 72 which extends in the front-rear direction. The atmospheric air communication hole 72 is open on the both sides in the front-rear direction of the spout 70. The spout 70 is fitted to the opening of the back wall 84, and thus the atmospheric air communication hole 72 makes communication between the storage chamber 77A and the outside.

The spout 71 has an inflow hole 73 which extends in the front-rear direction. The inflow hole 73 is open on the both sides in the front-rear direction of the spout 71. The spout 71 is fitted to the opening of the back wall 84, and thus the inflow hole 73 makes communication between the storage chamber 77A and the outside. The discharge needle 114 is inserted into the inflow hole 73. Note that it is also allowable that the inflow hole 73 can be opened/closed by a valve. In this case, the discharge needle 114 is inserted into the inflow hole 73, and thus the valve is changed from the closed state to the open state.

The spout 92 has a supply hole 93 (example of the supply port) which extends in the front-rear direction. The spout 92 is a part for constructing the pouch 90 as described later on. The supply hole 93 is open on the both sides in the front-rear direction of the spout 92. The spout 92 is fitted to the opening of the back wall 84, and thus the supply hole 93 makes communication between the internal space of a bag 91 of the pouch 90 and the outside. A supply needle 112 is inserted into the supply hole 93. Note that it is also allowable that the supply hole 93 can be opened/closed by a valve. In this case, the supply needle 112 is inserted into the inflow hole 93, and thus the valve is changed from the closed state to the open state.

Figure 13:
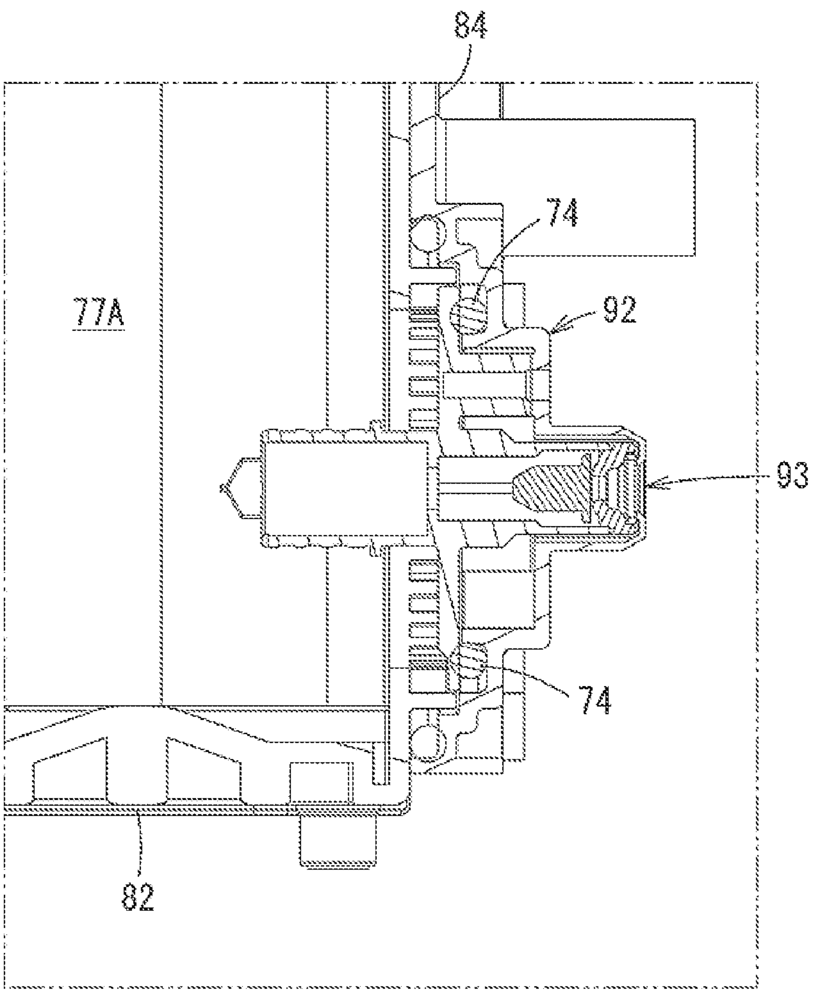
FIG. 13 is a partial sectional view of a spout 92 and a back wall 84.

As depicted in FIG. 13, an O-ring 74 is arranged and sealed in a liquid-tight manner between the spout 92 and the circumferential edge of the opening of the back wall 84 on the opening of the back wall 84. Although not depicted, an O-ring is also arranged and sealed in a liquid-tight manner between the spout 70, 71 and the circumferential edge of the opening of the back wall 84.

Figure 8:
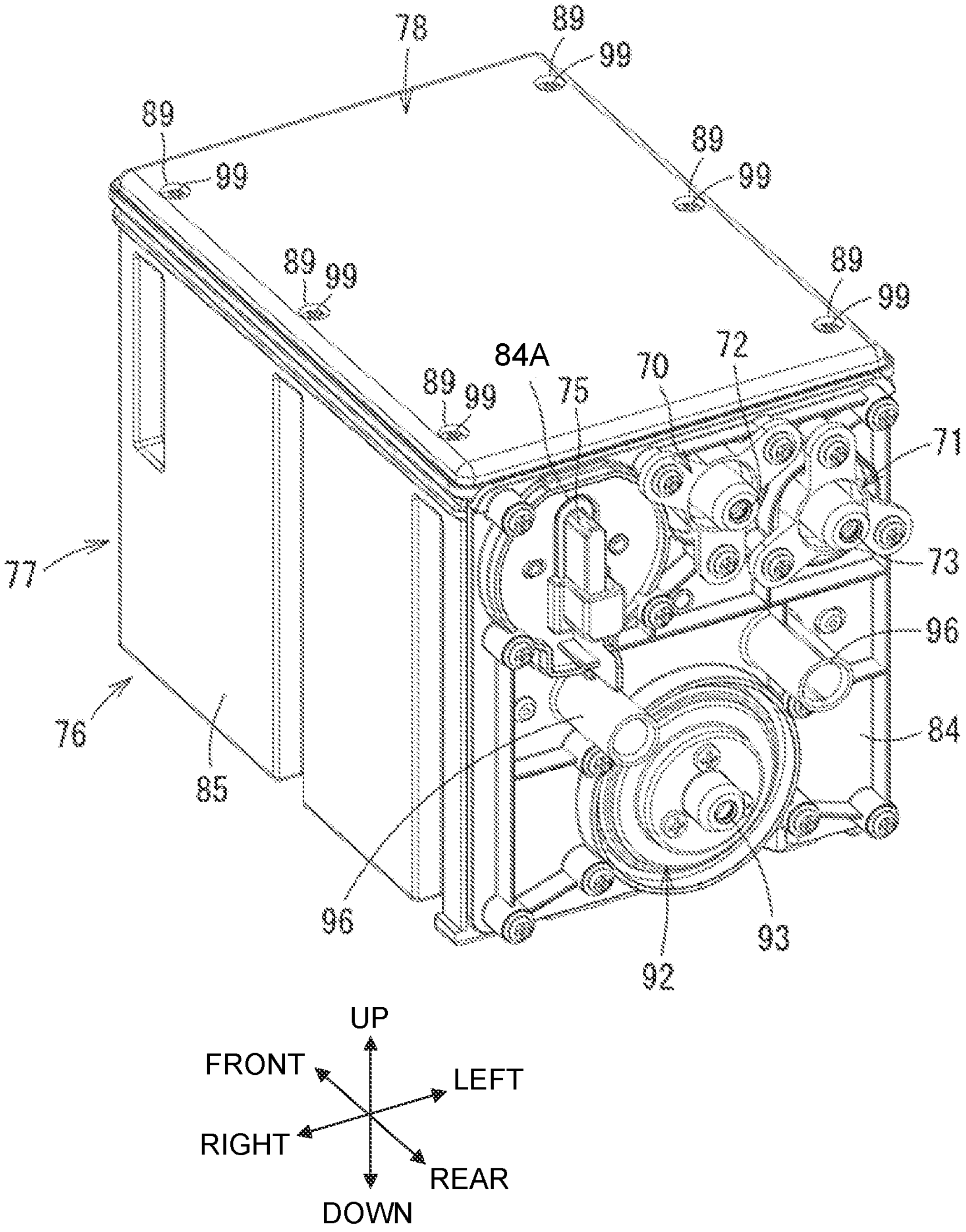
FIG. 8 is a perspective view of a cleaning liquid tank 76.
Figure 9:
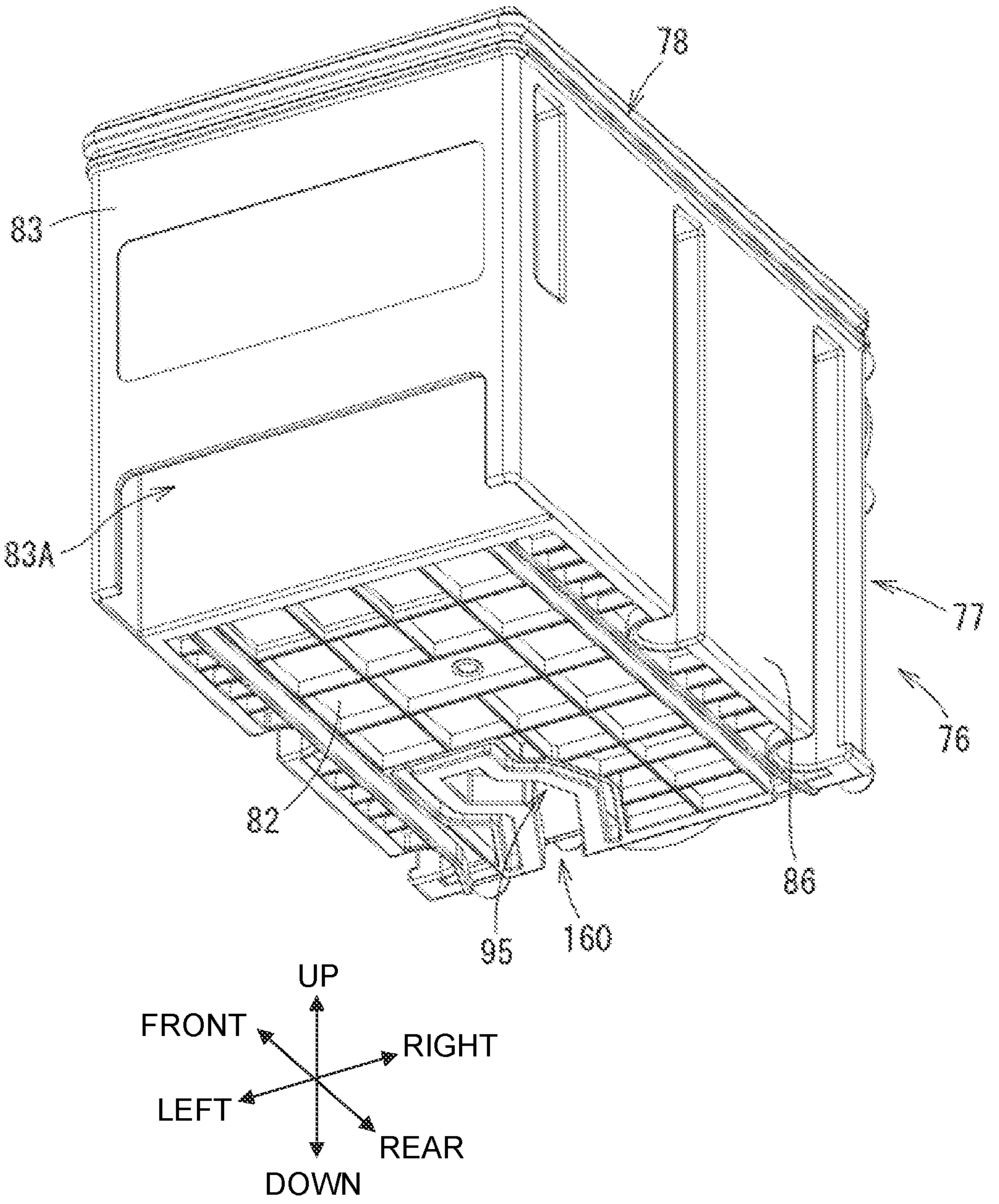
FIG. 9 is a perspective view of the cleaning liquid tank 76.
Figure 10:
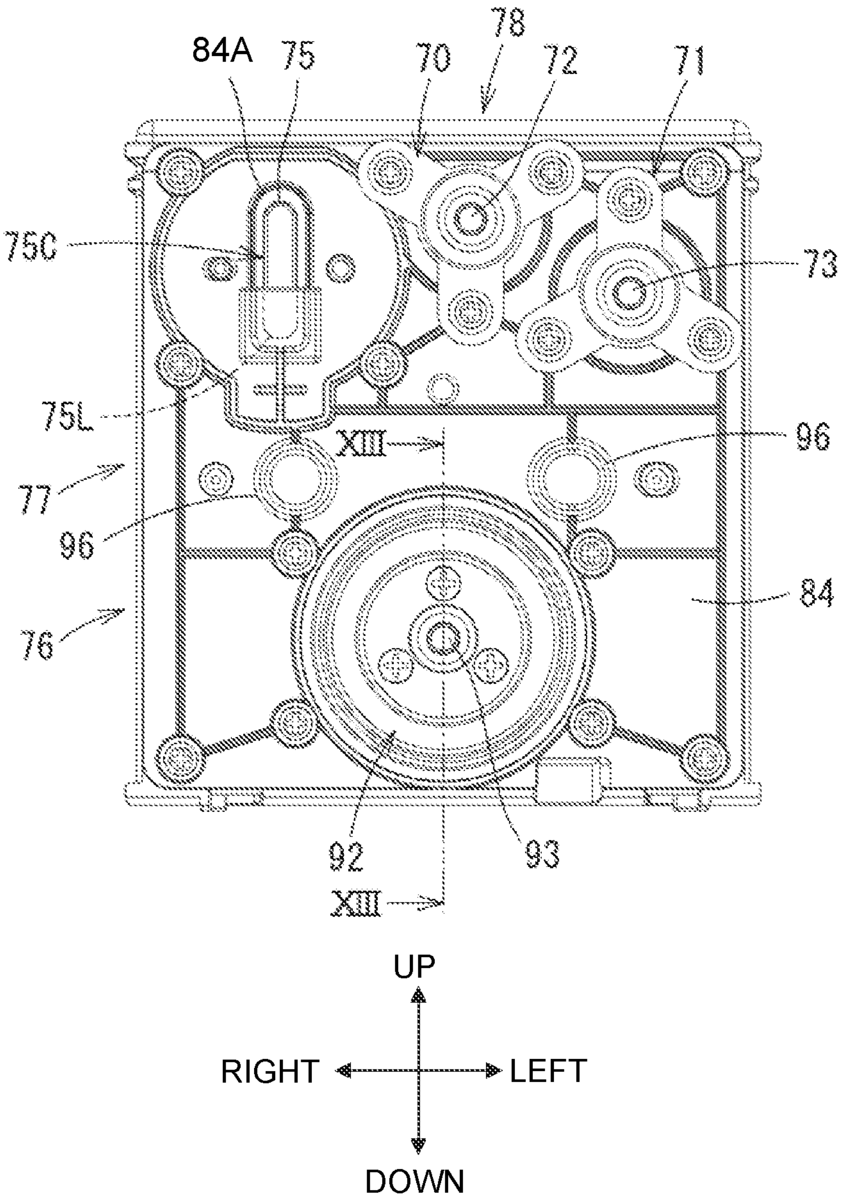
FIG. 10 is a back view of the cleaning liquid tank 76.

As depicted in FIG. 8 and FIG. 10, an indicator 75 is positioned on the back wall 84. The indicator 75 has a hollow box-shaped form composed of a member having the light transmittance. The indicator 75 has an outer shape which is slender in the up-down direction. The indicator 75 is exposed to the outside via the opening 84A of the back wall 84. The internal space of the indicator 75 is communicated with the storage chamber 77A. When the liquid surface of the waste liquid stored in the storage chamber 77A is raised to the position of the indicator 75, then the waste liquid enters the internal space of the indicator 75, and the liquid surface is formed at the same height as that in the storage chamber 77A. The indicator 75 has the light transmittance. Therefore, the liquid surface of the waste liquid, which is formed in the internal space of the indicator 75, can be visually recognized from the outside. The indicator 75 may be used to judge whether or not the liquid surface of the waste liquid is raised to a predetermined position of the indicator 75, for example, by providing an optical sensor for the cartridge installing unit 110. Note that the interstice between the indicator 75 and the circumferential edge of the opening 84A is sealed in a liquid-tight manner, for example, by means of a packing.

As depicted in FIG. 8 and FIG. 10, two cylinders 96 are positioned while being separated from each other in the left-right direction in the vicinity of the center in the up-down direction on the back wall 84. The distance between the two cylinders 96 is equivalent to the distance between the two positioning bosses 132 of the case 130. The cylinder 96 is open backward. The positioning boss 132 can enter the internal space of the cylinder 96.

Figure 14:
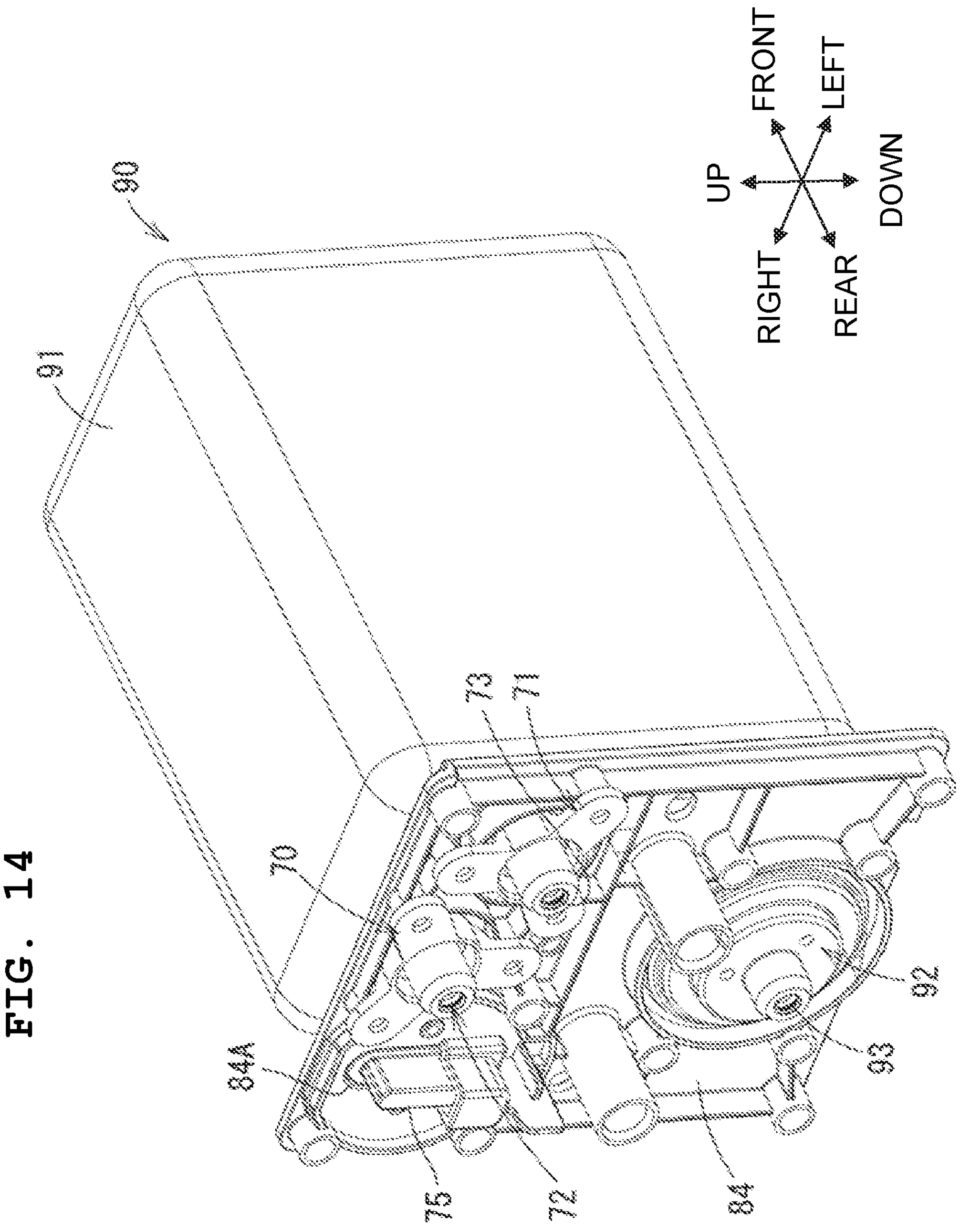
FIG. 14 is a perspective view of a pouch 90.

The pouch 90, which stores the cleaning liquid, is accommodated in the storage chamber 77A of the main case body 77. As depicted in FIG. 14, the pouch 90 has the flexible bag 91 and the spout 92. As depicted in FIG. 8 and FIG. 10, the spout 92 is fitted to the opening of the back wall 84 of the main case body 77. The bag 91 is positioned in the storage chamber 77A.

As depicted in FIG. 14, the bag 91 is expanded into a cube owing to the welding of a sheet made of synthetic resin. The spout 92 is positioned in the vicinity of the lower end of the bag 91. The spout 92 is a member made of synthetic resin. The spout 92 is welded to the circumference of a through-hole formed through the bag 91.

The cleaning liquid, with which the bag 91 is filled, is supplied to the maintenance mechanism 60. The cleaning liquid is finally discharged as the waste liquid to the storage chamber 77A. The ink, which is discharged from the head module 49, is also contained in the waste liquid discharged to the storage chamber 77A. Therefore, when the amount of the ink contained in the waste liquid is considered, it is preferable that the amount of the cleaning liquid, with which the bag 91 is filled, is slightly smaller than the volume of the storage chamber 77A.

Figure 15:
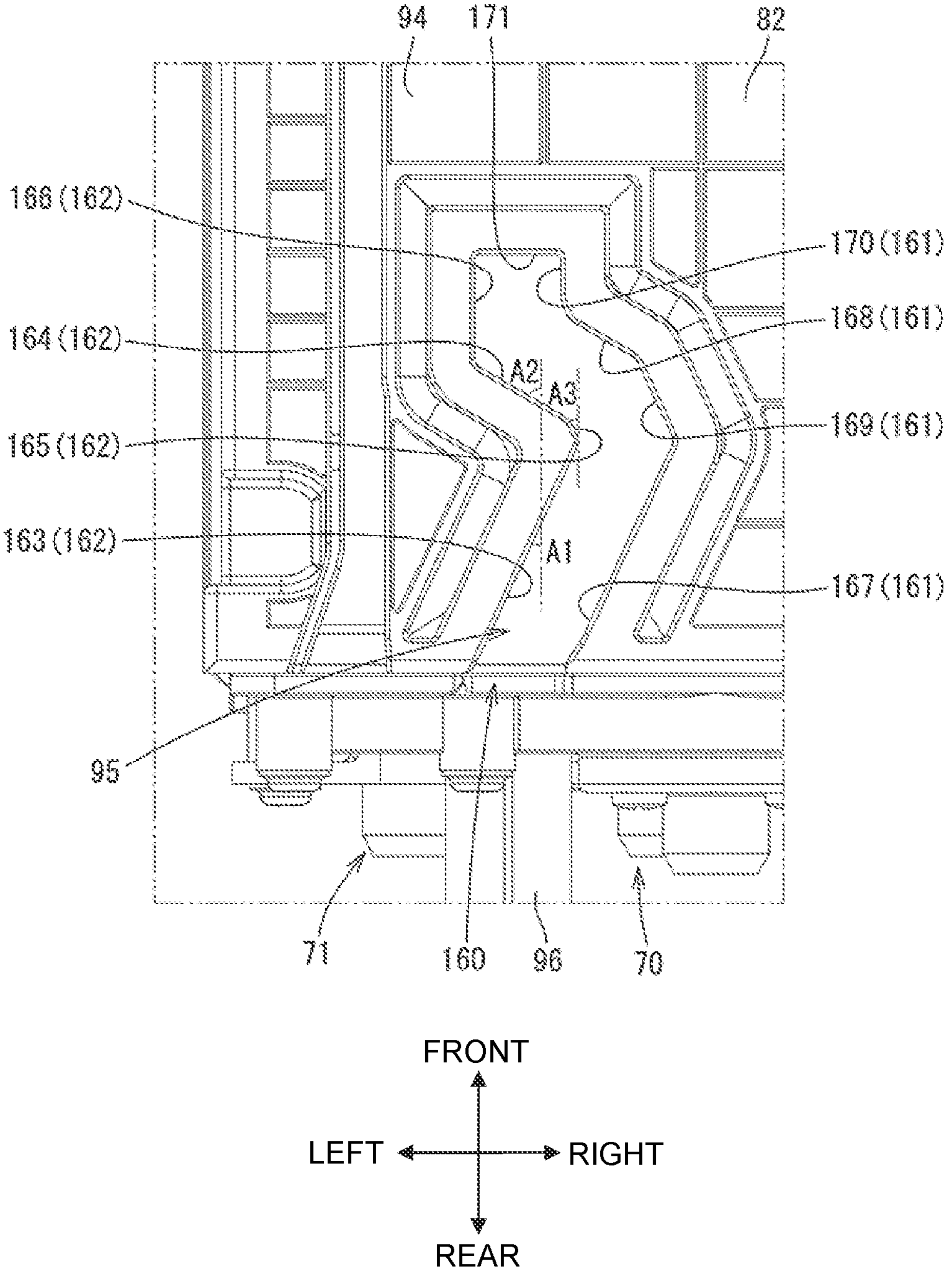
FIG. 15 is an enlarged bottom view of the cleaning liquid tank 76.

As depicted in FIG. 15, a groove 95, which is recessed upward, is positioned on a lower surface 94 which is the outer surface of the lower wall 82. The groove 95 has an entrance port 160 which is open frontward on the front surface that is the outer surface of the front wall 83. The groove 95 extends frontward in the front-rear direction while being directed in the left-right direction from the entrance port 160.

The groove 95 has a right surface 161 and a left surface 162 which are opposed to one another in the left-right direction. The groove 95 is comparted by the right surface 161 and the left surface 162 which spread in the up-down direction. The space between the right surface 161 and the left surface 162 is open downward.

The left surface 162 has a first surface 163, a second surface 164, a third surface 165, and a fourth surface 166. The first surface 163, the third surface 165, the second surface 164, and the fourth surface 166 are aligned in this order frontward or in the front orientation from the entrance port 160, and they are connected to one another.

As for the first surface 163, the normal vector is directed backward or in the back orientation (example of the installation orientation) of the front-rear direction and rightward or in the right orientation (example of one orientation) of the left-right direction. The second surface 164 is positioned frontward or in the front orientation (example of the removal orientation) of the front-rear direction as compared with the first surface 163. The normal vector is directed in the front orientation of the front-rear direction and in the right orientation of the left-right direction.

The third surface 165 connects the first surface 163 and the second surface 164. The normal vector is directed in the front orientation of the front-rear direction and in the right orientation of the left-right direction. As viewed in the up-down direction, the inclination angle A3 of the third surface 165 with respect to the front-rear direction is smaller than each of the inclination angle A1 of the first surface 163 with respect to the front-rear direction and the inclination angle A2 of the second surface 164 with respect to the front-rear direction (A3<A1, A3<A2). The fourth surface 166 extends in the back orientation along with the front-rear direction from the front end of the second surface 164. The normal vector of the fourth surface 166 is directed in the right orientation of the left-right direction.

The right surface 161 has a fifth surface 167, a sixth surface 168, a seventh surface 169, and an eighth surface 170. The fifth surface 167, the seventh surface 169, the sixth surface 168, and the eighth surface 170 are aligned in this order in the front orientation from the entrance port 160, and they are connected to one another.

The fifth surface 167 extends in parallel while opposing to the first surface 163 in the left-right direction. As for the fifth surface 167, the normal vector is directed in the front orientation of the front-rear direction and in the left orientation of the left-right direction. In the left-right direction, the sixth surface 168 extends in parallel while opposing to the second surface 164. The sixth surface 168 is positioned in the front orientation of the front-rear direction as compared with the fifth surface 167, and the normal vector is directed in the back orientation of the front-rear direction and in the left orientation of the left-right direction.

The seventh surface 169 extends in parallel while opposing to the third surface 165 in the left-right direction. The seventh surface 169 connects the fifth surface 167 and the sixth surface 168. The normal vector is directed in the back orientation of the front-rear direction and in the left orientation of the left-right direction. The eighth surface 170 extends in the front orientation along with the front-rear direction from the front end of the seventh surface 169. The normal vector of the eighth surface 170 is directed in the left orientation of the left-right direction.

The front end of the fourth surface 166 and the front end of the eighth surface 170 are connected to one another by the terminal surface 171. The normal vector of the terminal surface 171 is directed in the back orientation of the front-rear direction.

<Installation of Cleaning Liquid Cartridge 76 to Cartridge Installing Unit 110>

The cleaning liquid cartridge 76, which is to be inserted into the case 130 of the cartridge installing unit 110, is guided by the guide surface 134, and the cleaning liquid cartridge 76 is moved to the bottom surface 133 of the case 130. On the bottom surface 133 of the case 130, the cleaning liquid tank 76 is guided in the front-rear direction by the two guide ribs 143, and the cleaning liquid tank 76 advances in the back orientation.

As depicted in FIG. 16, the cleaning liquid tank 76 advances backward in the internal space of the case 130, wherein the latch 136 enters the groove 95 from the entrance port 160. The latch 136 is urged leftward or in the left orientation by the torsion coil spring 141. Therefore, the latch 136, which enters the groove 95, advances toward the third surface 165 while being rotated about the shaft 140 while abutting against the first surface 163 of the left surface 163. The latch 136 is moved leftward against the urging force of the torsion coil spring 141 in accordance with the first surface 163. The reaction force, which is transmitted from the latch 136 to the first surface 163, has the component which is directed frontward in the front-rear direction. Therefore, the force is transmitted to the user who inserts the cleaning liquid tank 76, as the resistance brought about when the cleaning liquid tank 76 is moved backward.

As depicted in FIG. 16, when the latch 136 is disposed in the vicinity of the front end of the first surface 163, the supply needle 112 of the case 130 does not enter the supply hole 93 of the cleaning liquid tank 76 as depicted in FIG. 17. Although not depicted in the drawing, the discharge needle 114 of the case 130 does not enter the inflow hole 73 of the cleaning liquid tank 76. As depicted in FIG. 18, the positioning bosses 132 of the case 130 enter the internal spaces of the cylinders 96 of the cleaning liquid tank 76. Accordingly, the cleaning liquid tank 76 is positioned in the up-down direction and the left-right direction with respect to the case 130. Note that in FIG. 17 and FIG. 18, the cover 78, the film 79, and the bag 91 of the cleaning liquid tank 76 are omitted.

When the cleaning liquid tank 76 is further moved backward, the latch 136 is thereby moved from the first surface 163 to the third surface 165. The reaction force, which is transmitted from the latch 136 to the third surface 165, has the component which is directed backward in the front-rear direction. Therefore, the feeling, in which the resistance brought about when the cleaning liquid tank 76 is moved backward disappears, is transmitted to the user.

When the cleaning liquid tank 76 is further moved backward, the latch 136 is thereby moved from the third surface 165 to the second surface 164. The second surface 164 is directed frontward in the same manner as the third surface 165. Further, the inclination angle A3 of the third surface 165 is smaller than the inclination angle A2 of the second surface 164. In other words, the inclination angle A2 of the second surface is larger than the inclination angle A3 of the third surface 165. The reaction force, which is transmitted from the latch 136 to the second surface 164, has the component which is directed backward in the front-rear direction. The magnitude of the component directed backward is larger than that of the reaction force transmitted on the third surface 165. Therefore, the feeling, in which the resistance brought about when the cleaning liquid tank 76 is moved backward disappears and the cleaning liquid tank 76 is further attracted backward, is transmitted to the user.

As depicted in FIG. 19, when the latch 136 is disposed in the vicinity of the front end of the second surface 164, the supply needle 112 of the case 130 enters the supply hole 93 of the cleaning liquid tank 76 as depicted in FIG. 20. Although not depicted in the drawing, the discharge needle 114 of the case 130 enters the inflow hole 73 of the cleaning liquid tank 76. As depicted in FIG. 21, such a state is given that the positioning bosses 132 of the case 130 further enter the internal spaces of the cylinders 96 of the cleaning liquid tank 76. Note that in FIG. 20 and FIG. 21, the cover 78, the film 79, and the bag 91 of the cleaning liquid tank 76 are omitted.

When the cleaning liquid tank 76 is further moved backward, the latch 136 is thereby moved from the second surface 164 to the fourth surface 166. The reaction force, which is transmitted from the latch 136 to the fourth surface 166, does not have the component directed in the front-rear direction. Therefore, this situation is transmitted to the user as if the feeling, in which the cleaning liquid tank 76 is attracted backward, disappears. Accordingly, the user acquires the feeling in which the installation of the cleaning liquid tank 76 is completed.

When the latch 136 is disposed on the fourth surface 166 as depicted in FIG. 22, the supply needle 112 of the case 130 further enters the supply hole 93 of the cleaning liquid tank 76 as depicted in FIG. 23. As depicted in FIG. 24, such a state is given that the positioning bosses 132 of the case 130 further enter the internal spaces of the cylinders 96 of the cleaning liquid tank 76. Accordingly, the cleaning liquid, which is stored in the pouch 90 of the cleaning liquid tank 76, is supplied to the maintenance mechanism 60 via the supply needle 112, the flow passage 113, and the supply tube 175. Further, the waste liquid, which outflows from the maintenance mechanism 60, is discharged to the storage chamber 77A of the cleaning liquid tank 76 via the waste liquid tube 178, the flow passage 115, and the discharge needle 114. Note that although not depicted, the positioning bosses 132 abut against the terminal surfaces of the internal spaces of the cylinders 96. Accordingly, the user acquires the feeling in which the cleaning liquid tank 76 cannot be further moved backward. Note that in FIG. 23 and FIG. 24, the cover 78, the film 79, and the bag 91 of the cleaning liquid tank 76 are omitted.

Technical Effects of the Embodiment

According to the present embodiment, when the cleaning liquid tank 76 is installed to the cartridge installing unit 110, then the latch 136 enters the groove 95, and the latch 136 moves along the first surface 163 and the second surface 164. Therefore, the user can be sensibly informed of the position at which the installation of the cleaning liquid tank 76 is completed.

The groove 95 may have a third surface 165 which connects the first surface 163 and the second surface 164 and which has an angle of inclination with respect to the installation orientation as viewed in an up-down direction, the angle of inclination being smaller than an angle of inclination of the first surface 163 and an angle of inclination of the second surface 164.

The latch 136 gently moves from the first surface 163 to the second surface 164 owing to the third surface 165 of the groove 95. Therefore, the user is suppressed from the transmission of any large shock.

The groove 95 may have a fourth surface 166 which extends in the removal orientation from the second surface 164.

Further, the component, which is given in the front-rear direction in relation to the reaction force of the latch 136, disappears owing to the fourth surface 166 of the groove 95. Therefore, the user can be sensibly informed of the presence of the range existing backward at the position at which the installation is completed.

The right surface 161 or the left surface 162 may have a fifth surface 167 which is opposed to the first surface 163 and which is directed in the removal orientation and in the other orientation of the left-right direction, and a sixth surface 168 which is positioned in the removal orientation as compared with the fifth surface 167, which is opposed to the second surface 164, and which is directed in the installation orientation and in the other orientation of the left-right direction.

Further, the latch 136, which enters the groove 95, passes between the first surface 163 and the fifth surface 167 and between the second surface 164 and the sixth surface 168. Therefore, even when the power or force to install the cleaning liquid tank 76 is strong, the latch 136, which abuts against the first surface 163 and the second surface 164, is suppressed from being greatly separated rightward in the left-right direction from the first surface 163 and the second surface 164. Accordingly, the smooth feeling is transmitted to the user.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

MODIFICATION

In the embodiment described above, the latch 136 is urged leftward in the left-right direction by the torsion coil spring 141. However, the latch 136 may be urged rightward. In this case, the groove 95 has a shape inverted in relation to the axis of symmetry along with the front-rear direction.

Further, the positioning bosses 132 and the cylinders 96 may be omitted. In this case, the user may acquire the feeling in which the cleaning liquid tank 76 cannot be further moved backward in accordance with the abutment of the latch 136 against the terminal surface 171 of the groove 95.

Further, in the embodiment described above, the explanation has been made as exemplified by the cleaning liquid tank 76 by way of example. However, the same or equivalent configuration may be also adopted for the ink tank 34 and the case 130. As depicted in FIG. 25, a groove 20, which is recessed upward, is positioned on the lower surface of the ink tank 34. The groove 20 is configured in the same manner as the groove 95. The surfaces of the groove 20, which are designated with the same reference numerals as those of the groove 95, are the surfaces which are the same as or equivalent to those of the groove 95. Accordingly, the user can be sensibly informed of the position at which the installation of the ink tank 34 is completed.

Further, the liquid, which is stored in the cleaning liquid tank 76, is merely an example. Other than the ink, it is also allowable to use a preserving liquid with which the head, the flow passage and the like are filled when the apparatus is not used for a long term. Further, the storage of the waste liquid with the cleaning liquid tank 76 as described above is not the essential configuration.

What is claimed is:

1. A liquid supply system comprising:

a liquid cartridge; and a cartridge installing unit in which the liquid cartridge is moved in one orientation of a front-rear direction so that the liquid cartridge is installed thereto, wherein the liquid cartridge includes:

a casing including:

a front surface;

a lower surface;

a storage chamber formed in the casing; and a supply port arranged on the front surface and communicated with the storage chamber, and a groove recessed upward and arranged on the lower surface of the casing, the groove includes:

an entrance port being opened on the front surface; and a right surface and a left surface defining the groove in a left-right direction intersecting the front-rear direction, at least one of the right surface and the left surface includes a first surface and a second surface, a normal vector of the first surface being directed in the one orientation of the front-rear direction and in one orientation of the left-right direction, and the second surface being positioned in the other orientation of the front-rear direction as compared with the first surface, a normal vector of the second surface being directed in the other orientation of the front-rear direction and in the one orientation of the left-right direction, the cartridge installing unit includes:

a case defining an internal space for inserting the liquid cartridge thereinto, the case being opened in the other orientation of the front-rear direction;

a needle extending in the other orientation of the front-rear direction in the internal space of the case;

a latch configured to move in the left-right direction on a bottom surface for comparting the internal space of the case; and an elastic member configured to urge the latch in the other orientation of the left-right direction, the latch enters the groove via the opening in a case that the liquid cartridge is inserted into the case, and the needle enters the supply port in a case that the liquid cartridge is inserted into the case.

2. The liquid supply system according to claim 1, wherein the groove includes a third surface connecting the first surface and the second surface, including an angle of inclination with respect to the one orientation of the front-rear direction as viewed in an upward-downward direction, the angle of inclination being smaller than an angle of inclination of the first surface and an angle of inclination of the second surface.

3. The liquid supply system according to claim 1, wherein the groove includes a fourth surface extending in the other orientation of the front-rear direction from the second surface.

4. The liquid supply system according to claim 1, wherein the other of the right surface and the left surface includes a fifth surface and a sixth surface, the fifth surface being opposed to the first surface and being directed in the other orientation of the front-rear direction and in the other orientation of the left-right direction, and the sixth surface being positioned in the other orientation of the front-rear direction as compared with the fifth surface, being opposed to the second surface, and being directed in the one orientation of the front-rear direction and in the other orientation of the left-right direction.

5. The liquid supply system according to claim 1, wherein the case includes a guide surface extending downward in the other orientation of the front-rear direction from the bottom surface.

* * * * *